United States Patent Office 2,774,776
Patented Dec. 18, 1956

2,774,776

DIHALOSTEROIDS

John A. Hogg, Philip F. Beal, and Frank H. Lincoln, Jr., Kalamazoo, Mich., assignors to The Upjohn Company, Kalamazoo, Mich., a corporation of Michigan No Drawing. Application August 30, 1952,
Serial No. 307,385

37 Claims. (Cl. 260—397.1)

This invention relates to certain 21,21-dihalo-21-acyl-steroids, a process for the production thereof, and to the use of these compounds in further syntheses involving other novel and useful steroid compounds, all as more fully disclosed hereinafter.

Certain of the novel compounds of the present invention have utility as precursors to known steroids, especially to the physiologically active cortical hormones 11β,17α,21-trihydroxy-4-pregnene-3,20-dione (Kendall's Compound F) and 17α,21-dihydroxy-4-pregnene-3,11,20-trione (Kendall's Compound E) and esters of the above-named compounds which may be prepared, in accordance with the present invention, by a series of representative reactions and compounds which may be graphically illustrated as follows:

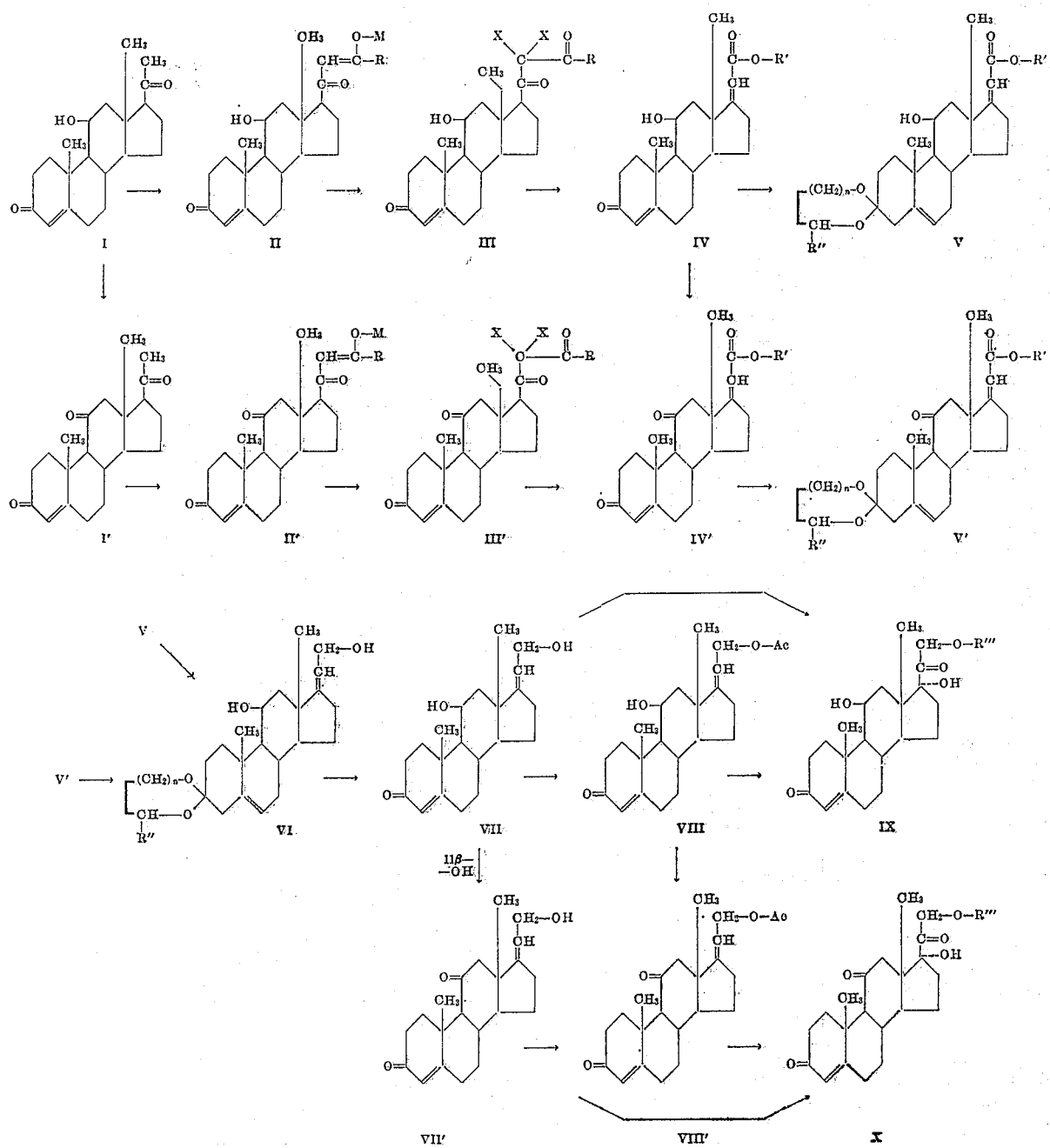

M=H, alkali metal
X=halogen
R=H, —COO-hydrocarbon
R', R"=H, hydrocarbon
R'''=H, acyl radical
n=1 or 2
Ac=acyl radical Treatment of an 11-keto-21,21-dihalo-21-alkoxyoxalyl-progesterone (III', R=COO-alkyl) or an 11-keto-21,21-dihalo-21-formylprogesterone (III', R=H) of the present invention with an alkali-metal alkoxide, e. g., sodium methoxide, is productive of a 3-11-diketo-4,17(20)-pregnadiene-21-oic acid alkyl ester (IV', R'=alkyl). Treatment of one of these compounds, after protecting the 3-ketone with a ketal group, e. g., an ethylene glycol ketal group (V', R'=alkyl, R''=H, $n$=3), an alkyl enol ether, or the like, with a reducing agent capable of reducing a carboxylic acid ester and a ketonic oxygen to hydroxy groups, e. g., lithium aluminum hydride, or other alkali-metal aluminum hydride, and then hydrolyzing the resulting reaction product (VI) is productive of 11β,21-dihydroxy-4,17(20)-pregnadiene-3-one (VII). This compound or a 21-acyl ester thereof is readily convertible to 11β,17α,21-trihydroxy-4-pregnene-3,20-dione (IX, R'''=H) (Kendall's Compound F) by reaction with osmium tetroxide to produce the 11β,17α,20,21-tetrahydroxy-4-pregnene-3-one osmate ester and subsequent oxidation, as with perchloric acid, salts thereof, or othe equivalent oxidizing agents such as hydrogen peroxide, dialkyl peroxides, organic peracids such as peracetic or perbenzoic acid, or the like, in a solvent such as an ether or an alcohol, e. g., tertiary butyl alcohol or diethyl ether, according to procedure already known in the art [Prins and Reichstein, Helv. Chim. Acta, 25, 300 (1942); Ruzicka and Mueller, Helv. Chim. Acta, 22, 755 (1939)].

Similarly, starting with an 11-hydroxy-21,21-dihalo-21-alkoxyoxalylprogesterone (III, R=COO-alkyl) or an 11-hydroxy-21,21-dihalo-21-formylprogesterone (III, R=H) of the present invention, and proceeding through the same reactions described above, but oxidizing the 11-hydroxy group to an 11-keto group, as with chromic acid, prior to the osmium tetroxide hydroxylation and the subsequent oxidation, is productive of 17α,21-dihydroxy-4-pregnene-3,11,20-trione (X, R'''=H) (Kendall's Compound E).

Selectively oxidizing 11β,21-dihydroxy-4,17(20)-pregnadiene-3-one (VII) with a N-halo-alkylamide, e. g., N-chloroacetamide, N-bromoacetamide, N-bromosuccinimide, or the like, and especially N-bromoacetamide, in an anhydrous ionic solvent in the presence of a base, particularly tertiary butyl alcohol in the presence of pyridine, or the like, at between about zero degrees centigrade and about fifty degrees centigrade, especially room temperature, is productive of 21-hydroxy-4,17(20)-pregnadiene-3,11-dione (VII'). Hydroxylating and oxidizing this compound or a 21-acyl ester thereof with osmium tetroxide and hydrogen peroxide, or the like, in the manner described above is productive of 17α,21-dihydroxy-4-pregnene-3-11,20-trione (Kendall's Compound E).

The novel 21,21-dihalo compounds of the present invention may be represented by the following formula:

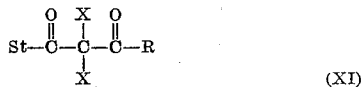

(XI)

wherein X is halogen having an atomic weight from 35 to 127, i. e., chlorine, bromine, or iodine, wherein R is hydrogen or a radical having the formula

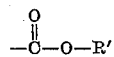

R' being a hydrocarbon radical, especially aliphatic radicals containing from one to eight carbon atoms, inclusive, and wherein St represents a cyclopentanopolyhydrophenanthrene nucleus attached to the above-identified side chain at carbon atom 17.

The preferred 21,21-dihalo compounds of the present invention, i. e., steroids readily convertible to Kendall's Compound E (17α,21 - dihydroxy - 4 - pregnene - 3,11,20-trione) (X, R'''=H) or Kendall's Compound F (11β, 17α,21 - trihydroxy - 4 - pregnene - 3,20 - dione) (IX, R'''=H), may be represented by the following formula:

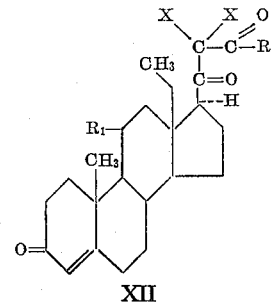

XII wherein R and X have the values given for Formula XI and wherein $R_1$ is α-hydroxy, β-hydroxy, or ketonic oxygen (=O).

The 21,21-dihalo steroids of the present invention are prepared by contacting a steroid having, in one of its forms, the following formula:

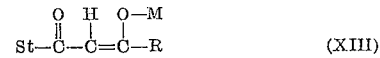 (XIII)

wherein M is hydrogen or an alkali metal, especially sodium or potassium, wherein R is hydrogen or a radical having the formula

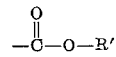

R' being a hydrocarbon radical, and wherein St represents a cyclopentanopolyhydrophenanthrene radical attached to the above-described side chain at carbon atom 17, with about two molar equivalents of a halogen having an atomic weight from 35 to 127, to produce a compound represented by Formula XI. When M is hydrogen in Formula XIII, the attached group, i. e.,

represents the enolic form of a carbonyl group. The preferred 21,21-dihalo compounds are prepared from compounds represented by Formula XIII wherein St represents an 11-oxygenated-4-androstene-3-one radical attached to the above-identified side chain at carbon atom 17.

The starting steroids are prepared by contacting the selected 20-ketosteroid with an ester of oxalic acid or an ester of formic acid in the presence of an alkali-metal base at a temperature between about zero degrees centigrade and the boiling point of the reaction mixture, usually in a solvent such as, for example, toluene, benzene, methanol, ethanol, mixtures of these, or the like, to produce a compound represented by Formula XIII wherein M is an alkali metal. Acidification of an aqueous solution of one of the above-described compounds is productive of a compound represented by Formula XIII wherein M is hydrogen.

Compounds thus-produced include steroids wherein an α-hydroxy or a β-hydroxy group, or a group hydrolyzable or convertible thereto, i. e., acyloxy, alkoxy, or the like, or ketonic oxygen, is attached to carbon atom 3, carbon atom 11, or both wherein there is no double bond, one double bond, or a plurality of double bonds in the steroid nucleus, and wherein there is a keto group at carbon atom 20 and an alkoxyoxalyl or a formyl group attached to carbon atom 21. When a 21-alkoxyoxalyl compound is employed as starting material, the alkoxy group thereof preferably contains from one to eight carbon atoms, inclusive, and methoxy and ethoxy are preferred. Starting steroids of particular interest are the sodium enolates of 11α-hydroxy- and 11-keto-21-alkoxyoxalylprogesterones wherein the alkoxy group is methoxy or ethoxy, and the sodium enolates of 11α-hydroxy- and 11-keto-21-formylprogesterone. The preparation of these starting steroids is more fully illustrated by the preparations hereinafter.

The halogenation step of the present invention is usually conducted in an organic solvent which is non-reactive under the conditions of the reaction. Methanol and ethanol have been found to be particularly useful solvents and are usually preferred, although chloroform or methylene chloride in the presence of pyridine, acetic acid in the presence of potassium acetate, and others may also be used. Since the presence of a base, e. g., an alkali-metal salt of an aliphatic acid, of carbonic acid, e. g., sodium carbonate, sodium bicarbonate, or the like appears to enhance the yield of desired product, the halogenation is usually conducted in the presence of a base, especially potassium or sodium acetate.

The halogenating agents are halogens having an atomic weight from 35 to 127, i. e., chlorine, bromine, or iodine. When bromine is used as the halogenating agent, it is usually added without a diluent, although chloroform, methylene chloride, or the like may be used as solvents when bromine is added as a solution in an organic solvent. When chlorine is used, it may be bubbled into the reaction mixture or used as a solution of the gas in an organic solvent. Iodine, when used as the halogenating agent, may be introduced as a solution in methylene chloride, chloroform, carbon tetrachloride, ethanol, or in any other convenient form.

In carrying out the halogenation, about two moles of halogen to one mole of starting steroid are employed. Use of substantially higher or lower ratios of halogen to starting steroid is not advantageous and is usually avoided, since less than optimum yields of product are usually obtained thereby. The reaction is most conveniently conducted at about room temperature, e. g., twenty to thirty degrees centigrade, although other temperatures, e. g., between about zero degrees centigrade and about sixty degrees centigrade may also be used.

The 21,21-dihalosteroid product may conveniently be isolated from the reaction mixture either by adding a large volume of water thereto if the reaction solvent is water-miscible, usually at about room temperature or lower, thus precipitating the desired 21,21-dihalosteroid, or the solvent may be removed from the reaction mixture leaving a residue which, after washing with water, consists essentially of the desired product.

The thus-produced 21,21-dihalosteroid, represented by Formula XII wherein the cyclopentanopolyhydrophenanthrene radical contains a 17-hydrogen, may be reacted with a base such as, for example, an alkali-metal hydroxide, an alkali-metal alcoholate, or the like, to produce a compound which may be represented by the following formula:

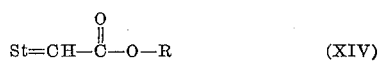

$$\text{St}=\text{CH}-\overset{\overset{\text{O}}{\|}}{\text{C}}-\text{O}-\text{R} \qquad (XIV)$$

wherein R is hydrogen or a hydrocarbon radical, preferably an aliphatic radical containing from one to eight carbon atoms, inclusive, and wherein St is a cyclopentanopolyhydrophenanthrene radical attached by the double bond to the above-identified side chain at carbon atom 17. Reacting 11 - keto - 21 - formyl - 21,21 - dibromoprogesterone (III', R=H, X=Br), for example, with an alkali-metal alkoxide, e. g., sodium methoxide, or similar base, in an alkanol, e. g., methanol, is productive of a 3,11-diketo-4,17(20)-pregnadiene-21-oic acid alkyl ester (IV', R=alkyl). Since the particular alkyl ester of the above-named acid, produced in the above described reaction, is determined by the alkyl group of the alkali-metal alkoxide employed in the reaction, when an alkanol is a reaction solvent, the alkyl group of the alkanol solvent is preferably the same as the alkyl group of the alkali-metal alkoxide employed in the reaction, thus eliminating the possibility of mixed ester formation due to exchange reactions. Other starting compounds from which these 21-oic acid alkyl esters are produced in this manner include 11-keto-21-formyl-21,21-dihaloprogesterones and 11 - keto - 21 - alkoxyoxalyl - 21,21 - dihaloprogesterones, wherein the halogen is chlorine, bromine, or iodine, and wherein the alkoxy group preferably contains from one to eight carbon atoms, inclusive, and especially wherein the alkoxy group is methoxy or ethoxy. Similarly, 3-keto-11α- or 11β-hydroxy-4,17(20)-pregnadiene-21-oic acid alkyl esters (IV, R'=alkyl) are prepared by reacting the selected 11-hydroxy-21-formyl or 21-alkoxyoxalyl-21,21-dihalosteroid with an alkali-metal alkoxide or similar base in an alkanol, especially methanol or ethanol, as described above.

When a 21-oic acid is the desired reaction product rather than an alkyl ester thereof, i. e., when R is hydrogen in Formula XIV, the reaction is performed in exactly the same manner except that the alkali-metal alkoxide of the reaction is replaced by an alkali-metal hydroxide, and that the reaction usually is carried out in a solvent containing water. After the reaction has gone to completion, acidification of the reaction mixture is productive of the free acid which can thereafter be separated and purified in the usual manner.

A particularly satisfactory procedure for obtaining a compound of Formula XIV, e. g., a 3-keto-11-oxygenated-4,17(20)-pregnadiene-21-oic acid or alkyl ester thereof, involves reacting the selected 21-acylsteroid (XIII) with about two molar equivalents of chlorine, bromine, or iodine, preferably bromine, in an alkanol, e. g., methanol or ethanol, advantageously in the presence of potassium acetate or the like, to produce the desired 21,21-dihalosteroid (XI), and then converting this compound directly, without isolation, to the desired 21-oic acid or ester (XIV). According to this mode of operation, an alkali-metal base, e. g. an alkali-metal alkoxide, is added to the reaction mixture after addition of halogen is complete to cause reaction thereof with the 21,21-dihalo compound (XI), to produce the desired 21-oic acid or ester (XIV), e. g., a 3-keto-11-oxygenated-4,17(20)-pregnadiene-21-oic acid or an alkyl ester thereof. These compounds can be converted to 21-hydroxy compounds as illustrated hereinafter by reactions involving the preferred 21-oic acids or esters thereof (IV, IV').

An additional product in the above-described reaction of a 21,21-dihalosteroid represented by Formula XI with an alkali-metal alkoxide, hydroxide, or the like, in an alkanol, is a compound represented by the Formula St—COOH (XV), commonly referred to as etio-acids. Many of these etio-acids are known compounds and are known precursors to physiologically active steroids [Wilde and Shunk, J. Am. Chem. Soc., 70, 2427 (1948), Steiger and Reichstein, Helv. Chim. Acta, 20, 1040 (1937), ibid., 20, 1164 (1937)]. For example, treatment of a 11β-hydroxy-21,21-dihalo-21 - alkoxyoxalylprogesterone, e. g., 11β - hydroxy - 21,21-dibromo-21-ethoxyoxalylprogesterone, with sodium methoxide in methanol is productive of, besides 3-keto-11β-hydroxy-4,17(20) - pregnadiene-21-oic acid methyl ester, 3-keto-11β-hydroxy-4-etiocholenic acid sodium salt. Acidification of the water-diluted reaction product, after washing with methylene chloride or ethyl acetate, produces a precipitate of 3-keto-11β-hydroxy-4-etiocholenic acid, which upon treatment, successively, with thionyl chloride or oxalyl chloride, diazomethane, and finally acetic acid, is productive of the physiologically active corticosterone acetate (11β-hydroxy-21-acetoxy-4-pregnene-3,20-dione).

Protection of the 3-keto group of a 3-keto-11-oxygenated-4,17(20)-pregnadiene-21-oic acid or alkyl ester thereof (IV, IV') for further reactions is usually accomplished by forming a ketal or enol ether at this position. The ketalization is usually accomplished by reacting the chosen starting steriod with an alkanol, e. g., methanol or ethanol, or a glycol, especially ethylene glycol, propylene glycol, trimethylene glycol, or the like, in a solvent such as, for example, benzene, toluene, xylene, or the like, and in the presence of an acid catalyst such as, for example, para-toluenesulfonic acid, hydrogen chloride, sulfuric acid, or the like. Alternatively, the reaction solvent may be the alkanol or glycol employed as ketalizing agent, since an excess of the alkanol or glycol is usually employed in the ketalization reaction. The preferred operating conditions involve refluxing the reaction mixture and concomitantly removing the water formed by the reaction of the glycol or alkanol with the 3-ketone. A cyclic ketal is produced when a glycol is employed (V, V'); however, a straight chain ketal or an alkyl enol ether is produced when an alkanol or an alkyl orthoformate is employed [Serni and Koster, Berichte, 71, 1766 (1938); Fleisher and Whitman, J. Am. Chem. Soc., 60, 1702 (1938); U. S. 2,363,338, November 21, 1944].

Washing the reaction product with dilute base and then distilling the reaction solvent leaves a residue consisting essentially of the desired 3-ketal of the selected starting 3-keto-11-oxygenated-4,17(20)-pregnadiene-21-oic acid or alkyl ester thereof.

When a 3-enol ether is the desired protective group, the formation of this group is most conveniently achieved by reacting the selected 3-keto-11-oxygenated-4,17(20)-pregnadiene-21-oic acid or alkyl ester thereof with an alkyl orthoformate, especially methyl or ethyl orthoformate. The reaction solvents and conditions for the formation of 3-enol ethers are essentially the same as for the production of a 3-ketal group. Frequently, the reaction conditions for producing a dialkyl ketal are productive instead of an alkyl enol ether and alkanols are sometimes used to produce alkyl enol ethers.

When the starting steroid is a free 21-oic acid, the acid may to some extent be esterified under the conditions of ketalization or enol ether formation, but this is not to be considered an undesirable side reaction since it in no way affects the course of the ketalization or enol-etherification of the 3-ketone group, if an excess of the ketalizing or enol-etherifying agent is employed, as is usually the practice, and since the ester group can be readily removed by hydrolysis, if desired.

The starting 3,11-diketo-4,17(20)-pregnadiene-21-oic acid or ester thereof (IV') can conveniently be prepared from a 3 - keto-11-hydroxy-4,17(20)-pregnadiene-21-oic acid or ester thereof (IV) by oxidizing the latter compound with an oxidizing agent such as, for example, chromic acid, potassium permangenate, or the like. The oxidation can be carried out in a heterogeneous mixture, e. g., the steroid in benzene reacted with chromic acid in water, or in a homogeneous solution, e. g., the steroid oxidized by chromic acid in acetic acid.

Treatment of a 3-keto-11-oxygenated-4,17(20)-pregnadiene-21-oic acid or ester thereof (IV, IV'), after first protecting the 3-keto group as described above, with a reducing agent such as lithium aluminum hydride or the like, is productive of a 3-ketal or enol ether, e. g., a cyclic ketal (XI) of an 11,21-dihydroxy-4,17(20)-pregnadiene-3-one. When a 3-ketal or enol ether of 3,11-diketo-4,17(20)-pregnadiene-21-oic acid or an alkyl ester thereof is the starting compound, the product of the reduction is essentially a 3-ketal or enol ether of 11β,21-dihydroxy-4,17(20)-pregnadiene-3-one. In a like manner, a 3-ketal or enol ether of 11β,21-dihydroxy-4,17(20)-pregnadiene-3-one is prepared by the reduction of a 3-ketal or enol ether of 3-keto-11β-hydroxy-4,17(20)-pregnadiene-21-oic acid or an alkyl ester thereof. Similarly, a 3-ketal or enol ether of 11α,21-dihydroxy-4,17(20)-pregnadiene-3-one is the reduction product of the above-described reaction when a 3-ketal or enol ether of 3 - keto-11α-hydroxy-4,17(20)-pregnadiene-21-oic acid or an alkyl ester thereof is the starting steroid.

The lithium aluminum hydride reduction is usually carried out by adding a solution of the selected 3-ketal or 3-enol ether of the selected 11-oxygenated-4,17(20)-pregnadiene-21-oic acid or alkyl ester thereof in an organic solvent which is non-reactive under the conditions of the reaction to a lithium aluminum hydride solution or suspension in ether. Other solvents which may be used include dioxane, tetrahydrofurane, or the like, as well as other solvents commonly used in lithium aluminum hydride reductions. When ether is used, the reaction is usually carried out at a temperature between about room temperature and the boiling point of the solvent, although temperatures substantially below room temperature may sometimes be successfully employed.

Lithium aluminum hydride is usually employed in a substantial chemical equivalent excess to ensure optimum yields of desired product. When the steroid and lithium aluminum hydride have been thoroughly mixed and the heat of reaction has subsided, the reaction is essentially complete. Continued stirring or heating or both are usually employed, however, to ensure completeness of reaction. The excess lithium aluminum hydride and the resulting steroid-LiAlH$_4$ complex is decomposed by the careful addition of water to the reaction mixture. If the reaction mixture is maintained at an alkaline pH, that is, if no acid is added during the decomposition of the lithium aluminum hydride or subsequent thereto, the corresponding 3-ketal or 3-enol ether of the 11,21-dihydroxy-4,17(20)-pregnadiene-3-one reaction product can be isolated from the reaction mixture. Separating the organic phase from the aqueous phase of the decomposed reaction mixture and then distilling the solvent therefrom leaves a distillation residue consisting essentially of the desired product. Products thus-produced from the corresponding 21-oic acid or alkyl ester thereof include 3-ketals and 3-enol ethers of 11,21-dihydroxy-4,17(20)-pregnadiene-3-one wherein the ketal group is either cyclic (VI) or straight chain, depending upon the starting steroid. Representative ketals include the dialkyl ketals, for example, the ethylene glycol, propylene glycol, or trimethylene glycol ketals. Representative 3-enol ethers are the alkyl enol ethers, e. g., the methyl or ethyl alkyl enol ethers. When the 11-oxygen function of the starting steroid is an 11-keto group, the product of the reaction is essentially one possessing an 11β-hydroxy group, whereas when the starting steroid possesses an 11α-hydroxy group, or an 11β-hydroxy group, the function at the 11-position is unaffected by the reduction reaction.

The resulting 11,21 - dihydroxy - 4,17(20) - pregnadiene-3-one 3-ketal or 3-enol ether may be isolated as described above for example, or further reacted without isolation as more fully disclosed hereinafter.

Purification of the above-described reaction products (VI) can be achieved by crystallization of the reaction product from a solvent such as, for example, acetone and hexane hydrocarbons, methylene chloride, or the like, or by chromatography over magnesium silicate or other suitable chromatography medium, using solvents which are neutral or slightly alkaline in nature.

The free 3-ketone, an 11,21-dihydroxy-4,17(20)-pregnadiene-3-one (VII), is prepared by treatment of a solution of the crude or purified 3-ketal or 3-enol ether of an 11,21-dihydroxy-4,17(20)-pregnadiene-3-one in an organic solvent with dilute aqueous acid, preferably a mineral acid such as, for example, hydrochloric or sulfuric acid, usually at about room temperature, for from about one-half hour to about 72 hours. The amount of the acid employed is usually from about a trace to a large molar excess and concentrations from extremely dilute to fairly concentrated may be employed since the acid acts only as a catalyst for the hydrolysis. When the hydrolysis product is 11α,21-dihydroxy-4,17(20)-pregnadiene-3-one, the hydrolysis of the 3-ketal or 3-enol ether can be carried out under fairly rigorous conditions, i. e., with fairly strong concentration of acid and at temperatures substantially above room temperature, whereas when the hydrolysis product is 11β,21-dihydroxy-4,17-(20)-pregnadiene-3-one, the hydrolysis reaction is preferably carried out at about room temperature and in the presence of more dilute acid since the 11β-hydroxy group has a tendency to dehydrate in the presence of acid. The reaction temperature and reaction time required to complete the hydrolysis reaction is somewhat dependent upon the particular 3-ketal or 3-enol ether group present in the steroid. Isolation of the free 11,21-dihydroxy-4,17(20)-pregnadiene-3-one is conveniently achieved by neutralizing the reaction mixture, distilling the solvent therefrom, or adding a large volume of water thereto if the solvent is water-miscible, and then removing the thus-precipitated product. The thus-isolated 11,21-dihydroxy-4,17(20)-pregnadiene-3-one, after drying, usually does not require purification for subsequent reactions if the starting 3-ketal or 3-enol ether was pure.

A somewhat more convenient procedure for obtaining an 11,21 - dihydroxy - 4,17(20) - pregnadiene - 3 - one (VII) from a 3,11 - diketo or 3 - keto - 11 - hydroxy - 4,17(20) - pregnadiene - 21-oic acid or alkyl ester thereof (IV, IV') involves reacting the starting 3,11 - diketo - or 3 - keto - 11 - hydroxy - 4,17(20) - pregnadiene - 21 - oic acid or alkyl ester thereof, protected at the 3-position with a 3-ketal or 3-enol ether, preferably a 3-ethylene glycol ketal (V, R''=H, $n$=1), with a reducing agent, e. g., lithium aluminum hydride, according to the procedure described above and then, after decomposing the excess lithium aluminum hydride with water, hydroylzing the 3-ketal or 3-enol ether of the reaction product without isolation. This is conveniently accomplished by adding a mineral acid, preferably hydrochloric acid, to the reaction mixture to render the mixture slightly acidic, and thereafter stirring the acidic reaction mixture for from about one-half hour to about 72 hours to remove the protecting group at the 3-position. Isolation of the thus-produced 11,21 - dihydroxy - 4,17(20) - pregnadiene-3-one is conveniently achieved by removing the organic layer from the reaction mixture, washing said layer with water or base, and then distilling the solvent therefrom to leave as distillation residue the essentially pure 11,21 - dihydroxy - 4,17(20) - pregnadiene - 3 - one (VII).

An 11,21-dihydroxy-4,17(20)-pregnadiene-3-one or 21-hydroxy-4,17(20)-pregnadiene-3,11-dione may be acylated at the 21-position by reaction with an acylating agent such as, for example, an acid anhydride, acid chloride, or a ketene of an organic carboxylic acid such as, for example, acetic, propionic, succinic, butyric, valeric, hexanoic, heptanoic, octanoic, $\beta$-cyclopentylpropionic, trimethylacetic, 2,6-dimethylbenzoic, or like acid, to produce an 11-hydroxy-21-acyloxy-4,17(20)-pregnadiene-3-one (VIII) or a 21-acyloxy-4,17(20)-pregnadiene-3,11-dione (VIII'), respectively. The 21-formate ester of the compounds VII or VII' is conveniently prepared by reacting the selected 11,21-dihydroxy-4,17(20)-pregnadiene-3-one or 21-hydroxy-4,17(20)-pregnadiene-3,11-dione with formic acid. When the 11-hydroxy group is an $\alpha$-hydroxy group, preferred acylating conditions involve the use of about equimolar amounts of acylating agent and steroid if it is desired to prevent esterification of the 11$\alpha$-hydroxy group. However, if the 11$\alpha$,21-diester is the desired product, use of an excess, e. g., two or more moles of acylating agent per mole of 11,21-dihydroxy-4,17(20)-pregnadiene-3-one, is preferred. When the steroid to be acylated is 11$\beta$,21-dihydroxy-4,17(20)-pregnadiene-3-one or 21-hydroxy-4,17(20)-pregnadiene-3,11-dione, use of an excess of acylating agent in the reaction is preferred since in the former compound the 11$\beta$-hydroxy group is not esterified under normal acylating conditions and since the latter compound has only one hydroxy group. The acylation of 11$\beta$,21-dihydroxy-4,17(20)-pregnadiene-3-one is preferably carried out in the presence of a base, e. g. pyridine or the like.

Solvents which are frequently employed in carrying out the acylating process include benzene, toluene, acetic acid, pyridine, and the like. Preferably the acylation is carried out at about room temperature or somewhat above to minimize decomposition of the starting steroid or product, although higher and lower temperatures, e. g., from about zero degrees centigrade to the boiling point of the reaction mixture, may also be used.

Isolation of the 21-acylated product is conveniently achieved by adding a large volume of water to the reaction mixture if the reaction solvent is water-miscible, or by distilling the solvent from the reaction mixture at reduced pressure to leave a residue consisting essentially of the desired product if the solvent is water-immiscible. Purification of the 11-hydroxy-21-acyloxy-4,17(20)-pregnadiene-3-one (VIII) or 21-acyloxy-4,17(20)-pregnadiene-3,11-dione (VIII') may be accomplished, for example by fractional crystallization from a suitable organic solvent or by chromatography over Florisil synthetic magnesium silicate, activated charcoal, or like agent.

The 11 - hydroxy - 21 - acyloxy - 4,17(20) - pregnadiene-3-ones, especially the 21-acetoxy compounds (VIII, Ac=acetyl), are extremely useful in oxidation reactions wherein the 21-hydroxy group would otherwise be affected. Oxidation of an 11-hydroxy-21-acyloxy-4,17-(20)-pregnadiene-3-one with chromic acid, for example, produces a 21-acyloxy-4,17(20)-pregnadiene-3,11-dione (VIII'), which is a valuable precursor to cortisone (17$\alpha$,21 - dihydroxy - 4 - pregnene - 3,11,20 - trione) (X, R'''=H), as shown below. The oxidizing agent is preferably employed in excess of the theoretically required one molar equivalent. The oxidation of an 11-hydroxy-21-acyloxy-4,17(20)-pregnadiene-3-one is preferably carried out with chromic acid although other oxidizing agents, e. g., potassium permanganate, may be employed. The oxidation may be performed in a heterogeneous mixture such as, for example, using water and benzene, or in a homogeneous mixture using a solvent such as acetic acid, for example. Isolation in conventional manner, as by distilling the solvent from the separated solvent layer in a heterogeneous oxidation or by the addition of water and methanol in a homogeneous oxidation is productive of a 21-aclyoxy-4,17(20)-pregnadiene-3,11-dione (VIII').

Treatment of an 11-hydroxy-21-acyloxy-4,17(20)-pregnadiene-3-one (VIII) with osmium tetroxide and hydrogen peroxide or like oxidizing agents, such as, for example, dialkyl peroxides, perchloric acid, or an organic peracid, either stepwise or simultaneously, according to known procedure for producing the dihydroxyacetone side-chain [Prins and Reichstein, Helv. Chim. Acta, 25, 300 (1942); Ruzicka and Mueller, Helv. Chim. Acta, 22, 755 (1939)], is productive of an 11,17$\alpha$-dihydroxy-21-acetoxy-4-pregnene-3,20-dione. To ensure complete destruction of any osmate esters present in the reaction, the reaction mixture is usually subjected to fairly rigorous hydroylsis conditions, e. g., heating the reaction mixture with an aqueous sodium sulfite solution at steam bath temperature. Under these conditions, a 21-acyloxy group, when present in the starting steroid, is sometimes hydrolyzed from the product to produce the corresponding 21-hydroxy compound. The extent of hydrolysis is somewhat dependent upon the particular acyloxy group present in the starting steroid and the hydrolysis conditions. Thus, when an 11$\beta$-hydroxy-21-acyloxy-4,17(20)-pregnadiene-3-one, e. g., the 21-acetoxy ester, is reacted with osmium tetroxide and perchloric acid or equivalent oxidizing agent, such as, for example, hydrogen peroxide, in a suitable solvent such as, for example, tertiary butyl alcohol, and the reaction mixture is heated for a few minutes in the presence of an aqueous sodium bisulfite solution, Kendall's Compound F (11$\beta$,17$\alpha$,21-trihydroxy-4-pregnene-3,20-dione) (X, R'''=H) is the predominant reaction product with smaller amounts of 11$\beta$,17$\alpha$ - dihydroxy - 21 - acetoxy - 4 - pregnene - 3,20-dione sometimes being present in the reaction product.

Similarly, reacting 21acetoxy-4,17(20)-pregnadiene-3,11-dione or similar 21-ester with osmium tetroxide and hydrogen peroxide or perchloric acid under the same or similar conditions is productive of Kendall's Compound E (17$\alpha$,21-dihydroxy-4-pregnene-3,11,20-trione) along with some 21-acylated product.

11β,17α,21-trihydroxy-4-pregnene-3,20-dione may also be prepared, under the same or similar conditions, from 11β,21 - dihydroxy - 4,17(20) - pregnadiene - 3 - one (VII). Since the method of producing Kendall's Compound F, according to the above-described series of reaction, involves the production of 11β,21-dihydroxy-4,17(20)-pregnadiene-3-one, the hydroxylation-oxidation of said compound with osmium tetroxide and hydrogen peroxide, or the like, directly without acylation of the 21-hydroxy group, is sometimes preferred since the number of steps in the production of Kendall's Compound F is reduced and the product thus-produced is free of 21-acylated product. A similar situation exists in the production of 11α,17α,21-trihydroxy-4-pregnene-3,20-dione, and here also 11α,21 - dihydroxy - 4,17(20) - pregnadiene - 3,20-dione is the preferred starting material in the above-described hydroxylation-oxidation reaction for the same reason.

Since either 21 - hydroxy - 4,17(20) - pregnadiene-3,11-dione or an ester thereof can be prepared from 3,11-diketo-4,17(20)-pregnadiene-21-oic acid or ester thereof, e. g., forming a 3-ketal of the latter compound, reacting the thus-produced compound with lithium aluminum hydride in ether and then hydrolyzing the reaction product is productive of 11β,21-dihydroxy-4,17(20)-pregnadiene-3-one which, as stated previously, can be oxidized directly with N-bromoacetamide or the like to 21-hydroxy-4,17(20)-pregnadiene-3,11-dione, or after first esterifying the 21-hydroxy group, can be oxidized with chromic acid or the like to a 21-acyloxy-4,17(20)-pregnadiene-3,11-dione; both 21-hydroxy-4,17(20)-pregnadiene-3,11-dione and esters thereof are satisfactory precursors to Kendall's Compound E (Cortisone) (X, R'''=H).

The following preparations and examples are illustrative of the products and process of the present invention and the utility of both the products and process of the present invention but are not to be construed as limiting.

The reactions described below are productive of compounds which are especially useful as precursors to 11β,17α,21-trihydroxy-4-pregnene-3,20 - dione (Kendall's Compound F).

PREPARATION 1.—SODIUM ENOLATE OF 11-KETO-21-ETHOXYOXALYLPROGESTERONE

To a mixture of 3.4 milliliters of a 3.4 N methanolic sodium methoxide solution, 0.45 milliliter of absolute ethanol, and twenty milliliters of dry benzene, said mixture previously having been distilled until eight milliliters of distillate had been collected and then cooled, was added 2.3 milliliters of ethyl oxalate and a solution of 3.28 grams of 11-ketoprogesterone in 38 milliliters of dry benzene. The solution became turbid and a yellow precipitate formed. The reaction mixture was stirred for ninety minutes, 55 milliliters of ether was then added thereto, and stirring was continued for sixty minutes, whereafter a 130-milliliter portion of ether was added thereto. The thus-formed yellow precipitate of the sodium enolate of 11-keto-21-ethoxy-oxalylprogesterone was filtered, washed with several fifty-milliliter portions of ether, and after drying found to weigh 3.65 grams. The ether wash contained 0.54 gram of unreacted 11-ketoprogesterone. The yield of the sodium enolate of 11-keto-21-ethoxyoxalylprogesterone was 81 percent of the theoretical or practically quantitative calculated on the reacted 11-ketoprogesterone. The presence of a sodium enolate was verified by the extreme solubility of the product in water and by a positive ferric chloride test for enols as exhibited by the formation of a bright red color when the product was dissolved in alcoholic and aqueous ferric chloride solutions.

Acidification of an aqueous solution of the thus-produced sodium enolate of 11-keto-21-ethoxyoxalylprogesterone is productive of 11-keto-21-ethoxyoxalylprogesterone which may be removed therefrom by filtration.

PREPARATION 2.—POTASSIUM ENOLATE OF 11-KETO-21-ETHOXYOXALYLPROGESTERONE

Using essentially the procedure described in Preparation 1, 11-ketoprogesterone is converted to the potassium enolate of 11-keto-21-ethoxyoxalylprogesterone by reaction with ethyl oxalate in benzene and potassium in tertiary butyl alcohol.

In a manner similar to Preparations 1 and 2, the following compounds are prepared by the reaction of 11-ketoprogesterone with the appropriate alkyl oxalate and sodium or potassium alkoxide in benzene, toluene, ethanol, or other suitable solvent: sodium enolate of 11-keto-21-methoxyoxalylprogesterone, sodium enolate of 11-keto-21-propoxyoxalylprogesterone, sodium enolate of 11-keto-21-butoxyoxalylprogesterone, sodium enolate of 11-keto-21-isobutoxyoxalylprogesterone, sodium enolate of 11-keto-21-amyloxyoxalylprogesterone, sodium enolate of 11-keto-21- hexyloxyoxalylprogesterone, sodium enolate of 11-keto-21-heptyloxyoxalylprogesterone, sodium enolate of 11-keto-21-octyloxyoxalylprogesterone, the potassium analogues of these and like compounds, and others.

Acidification of an aqueous solution of any of the above-described alkali-metal enolates is productive of a precipitate of the free 21-alkoxyoxalyl compound which can be removed therefrom by filtration.

PREPARATION 3.—SODIUM ENOLATE OF 11-KETO-21-FORMYLPROGESTERONE

To a mixture of 3.4 milliliters of a 3.4 N methanolic sodium methoxide solution, 0.45 milliliter of absolute ethanol, and twenty milliliters of dry benzene, said mixture previously having been distilled until eight milliliters of distillate had been collected and then cooled, was added two milliliters of ethyl formate and a solution of 3.28 grams (0.01 mole) of 11-ketoprogesterone in 38 milliliters of dry benzene. The solution became turbid and a yellow precipitate formed. The reaction mixture was stirred at room temperature for one hour, sixty milliliters of ether was then added thereto, and stirring was continued for ninety minutes, whereafter a sixty-milliliter portion of ether was added thereto. The thus-formed yellow precipitate of the sodium enolate of 11-keto-21-formylprogesterone was filtered, washed with several fifty-milliliter portions of ether, and after drying found to weigh 2.35 grams. The ether wash contained 1.21 grams of unreacted 11-ketoprogesterone. The yield of the sodium enolate of 11-keto-21-formylprogesterone was 62 percent of the theoretical or practically quantitative calculated on the reacted 11-ketoprogesterone. The presence of a sodium enolate was verified by the extreme solubility of the product in water and by a positive ferric chloride test for enols as exhibited by the formation of a red color when the product was dissolved in alcoholic and aqueous ferric chloride solutions. The structure was further verified by conversion of the enolate to the free 11-keto-21-formylprogesterone melting at 85 to 90 degrees centigrade and having an infrared absorption spectrum analysis consistent with the structure.

PREPARATION 4.—POTASSIUM ENOLATE OF 11-KETO-21-FORMYLPROGESTERONE

Using essentially the procedure described in Preparation 3, 11-ketoprogesterone is converted to the potassium enolate of 11-keto-21-formylprogesterone by reaction with ethyl formate and potassium in tertiary butyl alcohol.

In the same manner as described in Preparations 3 and 4, the following compounds are prepared by reacting the selected 20-ketosteroid with ethyl formate, or other alkylformate, in the presence of sodium base, preferably a sodium alkoxide: the sodium enolate of 21-formyl-4,16-pregnadiene-3,20-dione, the sodium enolate of 3α-hydroxy - 21 - formylpregnane-11,20-dione, (free enol, M. P.=95 to 102 degrees centigrade), the sodium enolate of 3α,17α-dihydroxy-21-formylpregnane-11,20-dione, the sodium enolate of 21-formyl-4-pregnene-3,20-dione, the sodium enolate of 16(17)-oxido-21-formyl-4-pregnene-3,20-dione, the sodium enolate of 3α,11α-dihydroxy-21-formylpregnane-20-one, the sodium enolate of 3α,17α-dihydroxy-21-formylpregnane-11,20-dione, and the like. The potassium enolates of these and other compounds are prepared by substituting potassium tertiary butoxide for the sodium base used in the above-described reaction. The free enols of the above-named compounds are prepared by acidifying an aqueous or alkanolic solution of any of the above-named compounds with hydrochloric acid or other acid.

The corresponding 21-alkoxyoxalyl derivatives of the above-named compounds are prepared by replacing the alkyl formate used in the above-described reaction with the appropriate alkyl oxalate.

Acidification of an aqueous solution of the potassium or sodium enolate of 11-keto-21-formylprogesterone is productive of a precipitate of 11-keto-21-formylprogesterone.

*Example 1.—11-keto-21,21-dibromo-21-ethoxyoxalyl progesterone*

To a stirred solution of 4.50 grams (0.01 mole) of the sodium enolate of 11-keto-21-ethoxyoxalylprogesterone and two grams of potassium acetate in seventy milliliters of glacial acetic acid was added 3.09 grams (1.00 ml.; 0.0193 mole) of bromine dropwise at room temperature. When the addition was complete, the reaction mixture was mixed with a large volume of water. The aqueous layer was then decanted from the precipitated viscous yellow product which was thereafter dissolved in alcohol and reprecipitated as a white solid by the dropwise addition of water. The yield of thus-produced 11-keto-21,21-dibromo-21-ethoxyoxalylprogesterone, after filtering and drying, was 4.0 grams, a yield of seventy percent of the theoretical.

Other 11-keto-21,21-dihalo-21-alkoxyoxalylprogesterones are prepared wherein the dihalo group is dibromo, dichloro, or diiodo and the alkoxy group is methoxy, ethoxy, propoxy, butoxy, amyloxy, hexyloxy, heptyloxy, octyloxy, or the like, by dihalogenating the selected 11-keto-21-alkoxyoxalylprogesterone with chlorine, bromine, or iodine, according to the method described in Example 1.

*Example 2.—11-keto-21,21-dichloro-21-formyl-progesterone*

In exactly the same manner as described in Example 1, contacting 11-keto-21-formylprogesterone with two molar equivalents of chlorine is productive of 11-keto-21,21-dichloro-21-formylprogesterone.

Similarly, 11-keto-21,21-dibromo-21-formylprogesterone and 11-keto-21,21-diiodo-21-formylprogesterone are prepared by using about two molar equivalent amounts of bromine and iodine, respectively, instead of the chlorine used in the above-described reaction.

In the same manner described in Examples 1 and 2, the following compounds are prepared by reacting a selected 20-keto-21-formlysteroid or an alkali-metal enolate thereof with about two molar equivalents of the appropriate selected halogen, i. e., chlorine, bromine, or iodine: 21,21-dibromo-21-formyl-4,16-pregnadiene-3,20-dione, 3α-hydroxy-21,21-dibromo-21-formylpregnane-11,20-dione (M. P., 193 to 200 degrees centigrade), 3α,17α-dihydroxy-21,21-diiodo-21-formylpregnane-11,20-dione, 16(17)-oxido-21,21-dibromo-21-formyl-4-pregnene-3,20-dione, 21,21-dibromo-21-formyl-4-pregnene-3,20-dione, 3α,11α-dihydroxy-21,21-dichloro-21-formyl-pregnane-20-one, 3α,17α-dihydroxy-21,21-diiodo-21-formylpregnane-11,20-dione, 21,21-dihalogen analogues of these, and the like.

The corresponding 21-alkoxyoxalyl compounds wherein the alkoxy group is methoxy, ethoxy, propoxy, butoxy, amyloxy, hexyloxy, heptyloxy, octyloxy, or the like, are prepared by replacing the starting 20-keto-21-formylsteroid or alkali-metal enolate by the appropriate 20-keto-21-alkoxyoxalylsteroid or alkali-metal enolate thereof.

*Example 3.—3,11-diketo-4,17(20)-pregnadiene-21-oic acid methyl ester*

To a solution of 5.90 grams (0.01 mole) of 11-keto-21,21-dibromo-21-ethoxyoxalylprogesterone, obtained according to the method given in Example 1, in 150 milliliters of methanol, was added 3.24 grams (0.06 mole) of commercial grade sodium methoxide. The resulting admixture was maintained for three hours at about 25 degrees centigrade, whereafter the whole was diluted with water and then extracted with two portions of methylene chloride. The methylene chloride extracts were dried with anhydrous sodium sulfate and the solvent was thereafter distilled at atmospheric pressure, leaving a quantitative yield of 3.60 grams of 3,11-diketo-4,17(20)-pregnadiene-21-oic acid methyl ester as an oil. This oil was dissolved in fifty milliliters of benzene and chromatographed over a column of 170 grams of Florisil synthetic magnesium silicate. The column was developed with 400-milliliter portions of solvent of the following composition and order: three portions of methylene chloride, five portions of methylene chloride plus five percent acetone, and one portion of acetone. The methylene chloride plus five percent acetone eluates were combined and the solvent was removed therefrom leaving 1.5 grams of crystalline 3,11-diketo-4,17(20)-pregnadiene-21-oic acid methyl ester which, after crystallization from acetone and Skellysolve B hexane hydrocarbons, melted at 213 to 214 degrees centigrade.

*Analysis.*—Calculated for $C_{22}H_{28}O_4$: C, 74.17; H, 7.92. Found: C, 74.37; H, 8.21.

*Example 4.—3,11-diketo-4,17(20)-pregnadiene-21-oic acid ethyl ester*

In the same manner as described in Example 3, 3,11-diketo-4,17(20)-pregnadiene-21-oic acid ethyl ester is prepared by replacing the sodium methoxide in methanol, used in the above described example with sodium ethoxide in ethanol.

Similarly, other 3,11-diketo-4,17(20)-pregnadiene-21-oic acid esters are prepared wherein the ester is lower-alkyl, e. g., propyl, butyl, amyl, hexyl, heptyl, octyl, or the like, by replacing the sodium methoxide in methanol used in the above-described reaction with the selected alkali-metal alkoxide in an alkanol.

*Example 5.—3,11-diketo-4,17(20)-pregnadiene-21-oic acid*

In exactly the same manner as given in Example 3, 3,11-diketo-4,17(20)-pregnadiene-21-oic acid was prepared from the sodium enolate of 11-keto-21-ethoxyoxalylprogesterone by substituting 3.4 grams (0.06 mole) of potassium hydroxide in ten milliliters of water for the sodium methoxide used in the above-described reaction, thus producing the potassium salt of the desired acid. The 3,11-diketo-4,17(20)-pregnadiene-21-oic acid was isolated by washing the reaction mixture with methylene chloride, acidifying with dilute hydrochloric acid and extracting the thus-produced oily precipitate with benzene. The benzene extract was washed with water, dried, and thereafter distilled at reduced pressure to remove the benzene. The residual 3,11-diketo-4,17(20)-pregnadiene-21-oic acid, after several crystallizations, melted at 255 to 260 degrees centigrade.

*Example 6.—3,11-diketo-4,17(20)-pregnadiene-21-oic acid*

In the same manner as described in Example 5, 3,11-diketo-4,17(20)-pregnadiene-21-oic acid is prepared by reacting any of the dihalo compounds described in Examples 1 and 2 with a base in the presence of water, preferably an alkali-metal hydroxide, e. g., sodium or potassium hydroxide, and thereafter acidifying the reaction mixture to produce the free acid.

*Example 7. — 3,11 - diketo-4,17(20)-pregnadiene-21-oic acid methyl ester (from the sodium enolate of 11-keto-21-ethoxyoxalylprogesterone)*

To a stirred solution of 4.50 grams (0.01 mole) of the sodium enolate of 11-keto-21-ethoxyoxalylprogesterone and two grams of potassium acetate in 150 milliliters of methanol was added dropwise 3.09 grams (1.00 ml.; 0.0193 mole) of bromine. When the addition was complete, 3.24 grams (0.06 mole) of sodium methoxide in forty milliliters of methanol was added thereto, whereafter the whole was maintained at about 25 degrees centigrade for sixteen hours. The reaction mixture was then mixed with a large volume of water and the whole was extracted successively with one portion of benzene and two portions of methylene chloride. The combined extracts were dried over anhydrous sodium sulfate and the solvent was then removed therefrom by distillation. The residue was dissolved in 100 milliliters of methylene chloride and chromatographed over and eluted from 150 grams of Florisil synthetic magnesium silicate in exactly the same manner described in Example 3. The methylene chloride plus five percent acetone eluates contained 1.2 grams of 3,11-diketo-4,17(20)-pregnadiene-21-oic acid methyl ester, melting at 155 to 188 degrees centigrade. Crystallization of these crystals from a mixture of acetone plus Skellysolve B hexane hydrocarbons gave crystals melting at 207 to 212 degrees centigrade.

Similarly, 3,11-diketo-4,17(20)-pregnadiene-21-oic acid methyl ester and other alkyl esters are prepared from 11-keto-21-formylprogesterone, other 11-keto-21-alkoxyoxalylprogesterones, or alkali-metal enolates thereof, described in Examples 1 and 2 without the isolation of the intermediately formed 21,21-dihalo compound by reaction of the selected 21-formyl or 21-alkoxyoxalyl compound with approximately two molar equivalents of the selected halogen in methanol or other alkanol followed by the addition thereto of sodium methoxide or other alkali-metal alkoxide and then acidifying the reaction mixture.

In the same manner as given in Examples 3, 4, or 7, the following compounds are prepared by reaction of the selected 20-keto-21-formyl-21,21-dihalosteroid or 20-keto-21-alkoxyoxalyl-21,21-dihalosteroid with sodium methoxide in methanol: 3α-hydroxy-11-keto-17(20)-pregnene-21-oic acid methyl ester (free acid, M. P., 285 to 288 degrees centigrade) from 3α-hydroxy-21-formyl-21,-21-dihalopregnane-11,20-dione or 3α-hydroxy-21-alkoxyoxalyl-21-21-dihalopregnane-11,20-dione, 3-keto-4,17(20)-pregnadiene-21-oic acid methyl ester from 21-formyl-21,21-dihalo-4-pregnene-3,20-dione or 21-alkoxyoxalyl-21,21-dihalo-4-pregnene-3,20-dione, 3α, 11α-dihydroxy-17(20)-pregnene-21-oic acid methyl ester from 3α, 11α-dihydroxy-21-formyl-21,21-dihalopregnane-20-one or 3α, 11α-dihydroxy-21-alkoxyoxalyl-21,21 - dihalopregnane-20-one, and other $\Delta^{17(20)}$-21-oic acid methyl ester steroids from other 20-keto-21-formyl-21,21-dihalosteroids possessing a 17-hydrogen or other 20-keto-21-alkoxyoxalyl-21,21-dihalosteroids possessing a 17-hydrogen by reaction of the latter compounds with sodium methoxide or potassium methoxide, or the like, in methanol, wherein in every case halo is a halogen having an atomic weight from 35 to 127, i. e., chlorine, bromine, iodine, or the like, and wherein alkoxy is, for example, methoxy, ethoxy, propoxy, butoxy, amyloxy, hexyloxy, heptyloxy, octyloxy, or the like. Esters other than the methyl ester of the 21-acid are prepared in the same manner using, instead of the alkali-metal methoxide in methanol, the selected alkali-metal alkoxide, e. g., sodium or potassium ethoxide, propoxide, isopropoxide, butoxide, amyloxide, hexyloxide, or octyloxide, in an alkanol, preferably corresponding to the alcohol portion of the alkali-metal alkoxide employed.

*Example 8.—3,11-diketo-4,17(20) - pregnadiene - 21 - oic acid methyl ester (from 3-keto-11α-hydroxy-4,17(20)-pregnadiene-21-oic acid methyl ester)*

To a stirred solution of 0.150 gram (0.00042 mole) of 3-keto-11α-hydroxy-4,17(20) - pregnadiene - 21 - oic acid methyl ester, prepared by the reaction of the sodium enolate of 11α-hydroxy-21-ethoxyoxalylprogesterone with bromine and then sodium methoxide according to the method of Example 7, dissolved in 17.5 milliliters of glacial acetic acid and cooled to fourteen degrees centigrade, was added dropwise, over a period of twenty minutes, a solution of 0.0825 gram of chromium trioxide dissolved in 1.65 milliliters of glacial acetic acid and 1.65 milliliters of water. The stirred solution was thereafter allowed to rise to eighteen degrees centigrade over a period of one hour. Excess chromium trioxide was destroyed by the addition of an aqueous sodium sulfite solution. The product was then extracted from the reaction mixture with three fifteen-milliliter portions of ether which were thereafter combined, washed with water, and dried over anhydrous sodium sulfate. The ether was then removed by evaporation. The 0.168 gram of residue consisted essentially of 3,11-diketo-4,17(20)-pregnadiene-21-oic acid methyl ester which was thereafter purified by recrystallization from a mixture of ethyl acetate and Skellysolve B hexane hydrocarbons to yield crystals melting at 208 to 220 degrees centigrade.

Similarly, other 3,11-diketo-4,17(20)-pregnadiene-21-oic acid alkyl esters are prepared by oxidizing the corresponding 11β- or 11α-hydroxy compound with an oxidizing agent, e. g., chromium trioxide, in a heterogeneous oxidizing media or according to the method given above, i. e., in a homogeneous solution. A typical heterogeneous oxidation involves the mixing of a solution of the hydroxysteroid to be oxidized in a non-reactive water-immiscible solvent, e. g., benzene, with an aqueous solution of the oxidizing agent, e. g., chromic acid, potassium permanganate, or the like. A homogeneous oxidation involves mixing a solution of the hydroxysteroid to be oxidized in a water-miscible non-reactive solvent, e. g., acetic acid, with an aqueous solution of the oxidizing agent, e. g. chromic acid. The corresponding free acid can be obtained by saponification of the selected ester with sodium hydroxide or the like and thereafter acidifying the reaction mixture. Alternatively, oxidizing 3-keto-11β- or 11α-hydroxy-4,17(20)-pregnadiene-21-oic acid with an oxidizing agent in the same manner as given above is productive of 3,11-diketo-4,17(20)-pregnadiene-21-oic acid.

*Example 9.—3-ethylene glycol ketal of 3,11-diketo-4,17(20)-pregnadiene-21-oic acid methyl ester*

To a solution of 1.5 grams (0.0042 mole) of 3,11-diketo-4,17(20)-pregnadiene-21-oic acid methyl ester dissolved in 150 milliliters of benzene was added 7.5 milliliters of ethylene glycol and 0.150 gram of para-toluenesulfonic acid and the whole was then heated with stirring at the reflux temperature of the reaction mixture for 5.5 hours. The cooled reaction mixture was washed with 100 milliliters of a one percent aqueous sodium bicarbonate solution. The benzene layer was then poured on a column of 150 grams of Florisil synthetic magnesium silicate. The column was developed with 100-milliliter portions of solvents of the following composition and order: eight portions of methylene chloride and three portions of methylene chloride plus four percent acetone. The methylene chloride eluates contained 1.08 grams of the 3-ethylene glycol ketal of 3,11-diketo-4,17(20)-pregnadiene-21-oic acid methyl ester, which upon recrystallization from a mixture of ethyl acetate and Skellysolve B hexane hydrocarbons melted at 188 to 190 degrees centigrade and had the analysis given below. The methylene chloride plus four percent acetone eluates contained 0.390 gram of pure starting 3,11-diketo-4,17-(20)-pregnadiene-21-oic acid methyl ester. The yield of product was 87 percent of the theoretical calculated on the amount of starting steroid which reacted.

*Analysis.*—Calculated for $C_{24}H_{32}O_5$: C, 71.94; H, 8.05. Found: C, 71.90; H, 7.95.

Similarly, the 3-ethylene glycol ketals of other alkyl esters of 3,11-diketo-4,17(20)-pregnadiene-21-oic acid such as, for example, the methyl ester, the propyl, butyl, amyl, hexyl, heptyl, octyl, or like ester, are prepared by reacting the selected alkyl ester of 3,11-diketo-4,17(20)-pregnadiene-21-oic acid with ethylene glycol according to the method described in Example 9 in the presence of an acid catalyst such as, for example, anhydrous hydrogen chloride, benzenesulfonic acid, para-toluenesulfonic acid, or the like.

*Example 10.—3-trimethylene glycol ketal of 3,11-diketo-4,17(20)-pregnadiene-21-oic acid methyl ester*

In the same manner as described in Example 9, reacting 3,11-diketo-4,17(20)-pregnadiene-21-oic acid methyl ester with trimethylene glycol in the presence of an acid catalyst is productive of the 3-trimethylene glycol ketal of 3,11-diketo-4,17(20)-pregnadiene-21-oic acid methyl ester.

Similarly, other 3-ketals of this and other esters of 3,11-diketo-4,17(20)-pregnadiene-21-oic acid are produced by the reaction of the selected ester of the above-described steroid acid, especially the methyl, ethyl, propyl, butyl, amyl, hexyl, heptyl, or octyl ester, with a glycol such as, for example, ethylene glycol, propylene glycol, trimethylene glycol, an alkyl substituted ethylene glycol, propylene glycol, or trimethylene glycol, or the like, or with an alcohol such as, for example, methyl alcohol, ethyl, propyl, butyl, hexyl, heptyl, octyl, or like alcohol, in the presence of an acid catalyst, such as, for example, para-toluenesulfonic acid, hydrogen chloride, sulfuric acid, or the like.

The 3-methyl enol ether of 3,11-diketo-4,17(20)-pregnadiene-21-oic acid methyl ester may be prepared in the same manner as described in Example 9 by substituting an equivalent amount of methyl orthoformate for the ethylene glycol in the above-described reaction. Distillation of the benzene, after washing the mixture with a dilute base, leaves a distillation residue which, after washing with a mixture of acetone and pentane hydrocarbons, consists essentially of pure 3-methyl enol ether of 3,11-diketo-4,17(20)-pregnadiene-21-oic acid methyl ester [3-methoxy-11-keto-3,5,17(20)-pregnatriene - 21 - oic acid methyl ester].

Similarly, other alkyl enol ethers such as, for example, the ethyl, propyl, butyl, amyl, hexyl, heptyl, octyl, or the like, are prepared by reacting 3,11-diketo-4,17(20)-pregnadiene-21-oic acid methyl ester or other alkyl ester with the selected alkyl orthoformate or alkanol.

*Example 11.—3-ethylene glycol ketal of 11β,21-dihydroxy-4,17(20)-pregnadiene-3-one*

A solution of 1.50 grams of the 3-ethylene glycol ketal of 3,11-diketo-4,17(20)-pregnadiene-21-oic acid methyl ester in seventy milliliters of benzene was added dropwise to a stirred mixture of 1.50 grams of lithium aluminum hydride and fifty milliliters of anhydrous ether. When addition was complete, the reaction mixture was refluxed for one-half hour whereafter the mixture was cooled to room temperature. Fifty milliliters of water was then cautiously added to the stirred reaction mixture to decompose the excess lithium aluminum hydride, followed by 200 milliliters of methylene chloride. The whole was then centrifuged to facilitate separation of the organic and aqueous phases. The organic phase was separated, the solvent distilled and the white crystalline distillation residue was crystallized from a mixture of ethyl acetate and Skellysolve B hexane hydrocarbons to yield 1.003 grams, a yield of 72 percent of the theoretical, of crystalline 3-ethylene glycol ketal of 11β,21-dihydroxy-4,17(20)-pregnadiene-3-one in two crops. The first crop, the analysis of which is given below, melted at 191 to 194 degrees centigrade and the second, at 172 to 180 degrees centigrade.

*Analysis.*—Calculated for $C_{23}H_{34}O_4$: C, 73.76; H, 9.15. Found: C, 73.87; H, 9.22.

*Example 12.—3-propylene glycol ketal of 11β,21-dihydroxy-4,17(20)-pregnadiene-3-one*

In the same manner as described in Example 11, the 3-propylene glycol ketal of 11β,21-dihydroxy-4,17(20)-pregnadiene-3-one is prepared by reacting the 3-propylene glycol ketal of an ester of 3,11-diketo-4,17(20)-pregnadiene-21-oic acid, prepared as given in Examples 9 and 10, with lithium aluminum hydride in ether.

Similarly, other 3-ketals of 11β,21-dihydroxy-4,17(20)-pregnadiene-3-one are prepared by reacting other 3-ketals of 3,11-diketo-4,17(20)-pregnadiene-21-oic acid or ester thereof, such as those compounds described in Examples 9 and 10, or the like, with lithium aluminum hydride in ether, dioxane, tetrahydrofurane, or other suitable solvent.

*Example 13.—11β,21-dihydroxy-4,17(20)-pregnadiene-3-one*

A solution of 0.572 gram (0.0015 mole) of the 3-ethylene glycol ketal of 11β,21-dihydroxy-4,17(20)-pregnadiene-3-one in forty milliliters of acetone was diluted with water to a volume of fifty milliliters and eight drops of concentrated sulfuric acid was then added thereto, whereafter the reaction mixture was kept at room temperature for 24 hours. The reaction mixture was then made alkaline by the addition of a saturated aqueous sodium bicarbonate solution and the acetone was then evaporated from the mixture. Methylene chloride and more water were then added, the methylene chloride layer removed, and the solvent distilled therefrom. The residue, after drying in vacuo, consisted of the theoretical 0.518 gram of 11β,21-dihydroxy-4,17(20)-pregnadiene-3-one.

In the same manner as described in Example 13, 11β,21-dihydroxy-4,17(20)-pregnadiene-3-one is prepared by contacting other 3-ketals of 11β,21-dihydroxy-4,17(20)-pregnadiene-3-one, especially the 3-ketals described in Examples 10 and 11, with a hydrolyzing agent such as, for example, dilute hydrochloric acid, sulfuric acid, or the like.

*Example 14.—11β,21-dihydroxy-4,17(20)-pregnadiene-3-one (without isolation of intermediate ketal)*

In exactly the same manner as described in Example 11, 11β,21-dihydroxy-4,17(20)-pregnadiene-3-one is prepared from the 3-ethylene glycol ketal of 3,11-diketo-4,17(20)-pregnadiene-21-oic acid methyl ester without the isolation of the intermediately produced 3-ethylene glycol ketal of 11β,21-dihydroxy-4,17(20)-pregnadiene-3-one, by substituting sufficient very dilute hydrochloric acid for the water used to decompose the excess lithium aluminum hydride in the above-described reaction so as to render the reaction mixture acidic.

*Example 15.—11β-hydroxy-21-acetoxy-4,17(20)-pregnadiene-3-one*

A solution of 0.518 gram of 11β,21-dihydroxy-4,17(20)-pregnadiene-3-one in five milliliters of pyridine was mixed with two milliliters of acetic anhydride and the whole was then maintained at room temperature for seventeen hours whereafter crushed ice was added thereto. The precipitated 11β-hydroxy-21-acetoxy-4,17(20)-pregnadiene-3-one was filtered therefrom, dissolved in benzene and then chromatographed over a column of 75 grams of Florisil synthetic magnesium silicate. The column was developed with 75-milliliter portions of solvents of the following composition and order: benzene, three portions each of Skellysolve B hexane hydrocarbons plus one percent acetone, Skellysolve B plus 5 percent acetone, Skellysolve B plus ten percent acetone, Skellysolve B plus fifteen percent acetone, Skellysolve B plus twenty percent acetone, and finally, two portions of acetone. The eluate fractions containing ten percent and fifteen percent acetone, respectively, were combined, the solvent removed therefrom, and the crystalline residue was crystallized from a mixture of ethyl acetate and Skellysolve B to yield as the first crop 0.253 gram, a yield of 45 percent of the theoretical, of 11β-hydroxy-21-acetoxy-4,17(20)-pregnadiene-3-one melting at 183 to 186 degrees centigrade.

*Analysis.*—Calculated for $C_{23}H_{32}O_4$: C, 74.16; H, 8.66. Found: C, 74.18, C, 73.95; H, 8.45, H, 8.74.

Similarly, other 21-organic carboxylic acid esters of 11β,21-dihydroxy-4,17(20)-pregnadiene-3-one are prepared wherein the 21-acyloxy group is formyloxy, propionyloxy, butyryloxy, valeryloxy, hexanoyloxy, heptanoyloxy, octanoyloxy, benzoyloxy, phenylacetoxy, or the like, by contacting 11β,21-dihydroxy-4,17(20)-pregnadiene-3-one with an appropriate acylating agent, e. g., the anhydride or acid halide of the selected acid in a solvent such as, for example, benzene, toluene, acetic acid, or the like. A convenient method of preparing the 21-formyloxy ester consists in contacting 11β,21-dihyroxy-4,17(20)-pregnadiene-3-one with formic acid in the presence of paratoluene-sulfonic acid.

Oxidation of 11β-hydroxy-21-acetoxy-4,17(20)-pregnadiene-3-one with chromic acid or like oxidizing agent is productive of 21-acetoxy-4,17(20)-pregnadiene-3,11-dione. Similarly, oxidation of other 21-acyloxy esters of 11β,21-dihydroxy-4,17(20)-pregnadiene-3-one, wherein the 21-acyloxy group is, e. g., formyloxy, propionyloxy, butyryloxy, valeryloxy, octanoyloxy, or the like, is productive of other 21-acyloxy esters of 21-hydroxy-4,17(20)-pregnadiene-3,11-dione.

*Example 16.—11β,17α,21-trihydroxy-4-pregnene-3-one (Kendall's Compound F)*

To a stirred suspension of 0.124 gram (0.00033 mole) of 11β-hydroxy-21-acetoxy-4,17(20)-pregnadiene-3-one in two milliliters of tertiary butyl alcohol was added 0.26 milliliter of a 2.6 molar solution of hydrogen peroxide in tertiary butyl alcohol and 0.30 milliliter of a solution of 1.00 gram of osmium tetraoxide in 100 milliliters of tertiary butyl alcohol. An additional 0.50 milliliter of the above-described osmium tetraoxide solution was added to the reaction mixture during the next thirty hours. After the first four hours of reaction time the reaction mixture darkened and became homogeneous. The reaction mixture was stirred and maintained at room temperature for an additional 84 hours, whereafter water and methylene chloride were added thereto. The whole was distilled at reduced pressure to remove the organic solvents and the product was extracted from the residue with methylene chloride, whereafter the extract was freed of solvent by evaporation. The residue, after dissolving in a mixture of five milliliters of methanol and one milliliter of a solution of 0.30 gram of sodium sulfite in five milliliters of water, was heated on a steam bath for thirty minutes. The 11β,17α,21-dihydroxy-4-pregnene-3,20-dione was separated therefrom by extraction with methylene chloride, which was thereafter removed by distillation in vacuo. The 0.101 gram of residue consisted of about fifty percent of the desired 11β,17α,21-trihydroxy-4-pregnene-3,20-dione (Kendall's Compound F).

In a like manner, 11β,17α,21-trihydroxy-4-pregnene-3,20-dione is prepared by contacting other esters of 11β,21-dihydroxy-4,17(20)-pregnadiene-3-one, especially the esters described in Example 15, with osmium tetroxide and hydrogen peroxide, perchloric acid or other perhalo acid or salts thereof, peracetic acid, or the like, in tertiary butyl alcohol, ethyl ether, or other suitable solvent.

The reactions described below are productive of compounds which are especially useful as precursors to 17α,21-dihydroxy-4-pregnene-3,11,20-trione (Kendall's Compound E).

PREPARATION 1A.—SODIUM ENOLATE OF 11α-HYDROXY-21-ETHOXYOXALYLPROGESTERONE

Three and three-tenths (3.3) grams of 11α-hydroxyprogesterone, Peterson and Murray, J. Am. Chem. Soc., 74, 1871 (1952), was dissolved in a solution of 0.25 gram of sodium in eight milliliters of absolute ethanol, and 1.46 grams of ethyl oxalate was added thereto. The resulting solution was allowed to stand for six hours at room temperature, during which time the color of the solution changed from yellow to brown. The sodium enolate of 11α-hydroxy-21-ethoxyoxalylprogesterone thus-produced was isolated, by the addition of a large volume of ether, as a yellow amorphous solid which decomposed above 200 degrees centigrade.

The structure of this yellow solid was confirmed by infra-red analysis which displayed the following significant absorption: (1) strong absorption at about 1720 cm.$^{-1}$ which is within the range for a conjugated ester, thus indicating the presence of such a group and substantiating the success of the reaction; (2) strong absorption at about 1631 cm.$^{-1}$ and about 1465 cm.$^{-1}$, these absorption bands being characteristic of metal enolates which evidences that a sodium enolate was obtained as postulated; (3) strong absorption at about 1670 cm.$^{-1}$ which is characteristic of a simple conjugated ketone, thus verifying the unchanged characteristics of the $\Delta^4$-three keto group of the starting 11α-hydroxyprogesterone and negating the possibility of condensation at position two. The condensation therefore took place at the other activated position, namely position 21.

PREPARATION 2A.—POTASSIUM ENOLATE OF 11α-HYDROXY-21-ETHOXYOXALYLPROGESTERONE

Using essentially the procedure described in Preparation 1A, 11α-hydroxyprogesterone is converted to the potassium enolate of 11α-hydroxy-21-ethoxyoxalylprogesterone by reaction with ethyl oxylate and potassium in tertiary butyl alcohol.

In a manner similar to Preparations 1A and 2A, the following compounds are prepared by reaction of 11α-hydroxyprogesterone and the appropriate alkyl oxalate with a sodium or potassium alkoxide in benzene: sodium enolate of 11α-hydroxy-21-methoxyoxalylprogesterone, sodium enolate of 11α-hydroxy-21-propoxyoxalylprogesterone, sodium enolate of 11α-hydroxy-21-butoxyoxalylprogesterone, sodium enolate of 11α-hydroxy-21-amyloxyoxalylprogesterone sodium enolate of 11α-hydroxy-21-hexyloxyoxalylprogesterone, sodium enolate of 11α-hydroxy-21-heptyloxyoxalylprogesterone, sodium enolate of 11α-hydroxy-21-octyloxyoxalylprogesterone, the potassium analogues of these and like compounds, and others.

Acidification of an aqueous solution of any of the above-described alkali-metal enolates is productive of a precipitate of the free 11α-hydroxy-21-alkoxyoxalylprogesterone.

PREPARATION 3A.—SODIUM ENOLATE OF 11α-HYDROXY-21-FORMYLPROGESTERONE

To a mixture of 3.4 milliliters of a 3.4 N methanolic sodium methoxide solution, 0.45 milliliter of absolute ethanol, and twenty milliliters of dry benzene, said mixture previously having been distilled until eight milliliters of distillate had been collected and then cooled, was added two milliliters of ethyl formate and a solution of 3.26 grams (0.01 mole) of 11α-hydroxyprogesterone in 38 milliliters of dry benzene. The solution became turbid and a yellow precipitate formed. The reaction mixture was stirred at room temperature for one hour, sixty milliliters of ether was then added thereto, and stirring was continued for ninety minutes, whereafter a sixty-milliliter portion of ether was added thereto. The thus-formed yellow precipitate of the sodium enolate of 11α-hydroxy-21-formylprogesterone was filtered and washed with several fifty-milliliter portions of ether. The ether wash contained some unreacted 11α-hydroxyprogesterone. The presence of a sodium enolate was verified by the extreme solubility of the product in water and by a positive ferric chloride test for enols as exhibited by the formation of a red color when the product was dissolved in alcoholic and aqueous ferric chloride solutions. The structure was further verified by conversion of the enolate to the free 11α-hydroxy-21-formylprogesterone, having an infrared absorption spectrum analysis consistent with that structure.

PREPARATION 4A.—POTASSIUM ENOLATE OF 11α-HYDROXY-21-FORMYLPROGESTERONE

Using essentially the procedure described in Preparation 3A, 11α-hydroxyprogesterone is converted to the potassium enolate of 11α-hydroxy-21-formylprogesterone by reaction with ethyl formate and potassium in tertiary butyl alcohol.

Acidification of an aqueous solution of either the sodium or potassium enolate of 11α-hydroxy-21-formylprogesterone is productive of a precipitate of 11α-hydroxy-21-formylprogesterone.

PREPARATION 5A.—SODIUM ENOLATE OF 11β-HYDROXY-21-ETHOXYOXALYLPROGESTERONE

One hundred and forty-four (144) milligrams (6.25 millimoles) of sodium was dissolved in five milliliters of absolute ethanol under an atmosphere of nitrogen and to this solution were added eight milliliters of benzene and 0.8 milliliter (0.9 gram; 6.15 millimoles) of ethyl oxalate. The mixture was cooled in an ice-water bath and a solution of 1.99 grams (6.03 millimoles) of 11β-hydroxyprogesterone, dissolved in five milliliters of absolute ethanol and mixed with 25 milliliters of dry benzene, was added in a slow stream to the stirred solution. The reaction mixture was stirred at room temperature for 2.5 hours at the end of which time a 100-milliliter portion of ether was added followed by another 100-milliliter portion of ether one hour later. The thus-produced pale yellow precipitate was filtered and washed with ether. The yield was 1.68 grams (62 percent).

The yellow solid, identified as the sodium enolate of 11β-hydroxy-21-ethoxyoxalylprogesterone by conversion to the known corticosterone acetate, displayed the following significant infrared absorption: (1) strong absorption at about 1716 cm.$^{-1}$, which is within the range of a conjugated ester; (2) strong absorption at about 1634 cm.$^{-1}$ and 1470 cm.$^{-1}$, these absorption bands being characteristic of metal enolates; (3) strong absorption at about 1670 cm.$^{-1}$ which is characteristic of simple conjugated ketones; those absorption bands verifying the theoretical structure.

PREPARATION 6A.—POTASSIUM ENOLATE OF 11β-HYDROXY-21-FORMYLPROGESTERONE

Using essentially the procedure described in Preparation 5A, 11β-hydroxyprogesterone is converted to the potassium enolate of 11β-hydroxy-21-formylprogesterone by reaction with ethyl formate and potassium in tertiary butyl alcohol.

Acidification of a solution of either the sodium or potassium enolate of 11β-hydroxy-21-formylprogestrone is productive of 11β-hydroxy-21-formylprogesterone.

Example 1A.—11α-hydroxy-21,21-dibromo-21-ethoxyoxalylprogesterone

To a stirred solution of 4.52 grams (0.01 mole) of the sodium enolate of 11α-hydroxy-21-ethoxyoxalylprogesterone in 150 milliliters of methanol was added dropwise one milliliter (0.02 mole) of bromine. The thus-produced 11α-hydroxy-21,21-dibromo-21-ethoxyoxalylprogesterone is isolated by pouring the reaction mixture into a large volume of water and separating the precipitated product.

Other 11α-hydroxy-21,21-dihalo-21-alkoxyoxalylprogesterones are prepared wherein the dihalo group is dibromo, dichloro, or diiodo and the alkoxy group is methoxy, ethoxy, propoxy, butoxy, amyloxy, hexyloxy, heptyloxy, octyloxy, or the like, by dihalogenating the selected 11α-hydroxy-21-alkoxyoxalylprogesterone or alkali-metal enolate thereof with chlorine, bromine, or iodine, according to the method described in Example 1A.

Example 2A.—11α-hydroxy-21,21-dichloro-21-formylprogesterone

In exactly the same manner as described in Example 1A, contacting 11α-hydroxy-21-formylprogesterone with approximately two molar equivalents of chlorine is productive of 11α-hydroxy-21,21-dichloro-21-formylprogesterone.

Similarly, 11α-hydroxy-21,21-dibromo-21-formylprogesterone and 11α-hydroxy-21,21-diiodo-21-formylprogesterone are prepared by substituting an equivalent molar amount of bromine and iodine, respectively, for the chlorine used in the above-described reaction of Example 2A.

Example 3A.—11β-hydroxy-21,21-dibromo-21-ethoxyoxalylprogesterone

In exactly the same manner as described in Example 1A, contacting the sodium enolate of 11β-hydroxy-21-ethoxyoxalylprogesterone with approximately two molar equivalents of bromine is productive of 11β-hydroxy-21,21-dibromo-21-ethoxyoxalylprogesterone.

In a similar manner, other 11β-hydroxy-21,21-dihalo-21-alkoxyoxalylprogesterones are prepared wherein the alkoxy group is methoxy, ethoxy, propoxy, butoxy, amyloxy, hexyloxy, heptyloxy, octyloxy, or the like, by reacting the selected 11β-hydroxy-21-alkoxyoxalylprogesterone or alkali-metal enolate thereof with approximately two moles of chlorine, bromine, or iodine.

Similarly, 11β-hydroxy-21,21-dihalo-21-formylprogesterones are prepared by substituting 11β-hydroxy-21-formylprogesterone or an alkali-metal enolate thereof for 11β-hydroxy-21-ethoxyoxalylprogesterone in the procedure of the foregoing example.

Example 4A.—3-keto-11α-hydroxy-4,17(20)-pregnadiene-21-oic acid methyl ester

To a solution of 29.4 grams (0.05 mole) of 11α-hydroxy-21,21-dibromo-21-ethoxyoxalylprogesterone in 550 milliliters of methanol was added a solution of 16.5 grams (0.3 mole) of sodium methoxide in 500 milliliters of methanol. The reaction mixture was maintained at about 25 degrees centigrade for sixteen hours whereafter an equal volume of water was added thereto and the whole was extracted with about equal portions of first benzene and then two portions of methylene chloride. The combined extracts were dried with anhydrous sodium sulfate and thereafter distilled to remove the solvent therefrom. The distillation residue was dissolved in 500 milliliters of methylene chloride and chromatographed over 875 grams of Florisil synthetic magnesium silicate. The column was developed with 1,250-milliliter portions of solvents of the following composition and order: four of methylene chloride plus five percent acetone, four of methylene chloride plus ten percent acetone, four of methylene chloride plus fifteen percent acetone, two of methylene chloride plus twenty percent acetone, and finally, two of acetone. The methylene chloride plus ten percent acetone eluates and the first methylene chloride plus fifteen percent acetone eluate were combined and the solvent distilled therefrom. The seven grams of distillation residue was recrystallized from a mixture of ethyl acetate and Skellysolve B hexane hydrocarbons to yield crystalline 3-keto-11α-hydroxy-4,17(20)-pregnadiene-21-oic acid methyl ester, melting at 205 to 210 degrees centigrade.

Analysis.—Calculated for $C_{22}H_{30}O_4$: C, 73.75; H, 8.48. Found: C, 73.77, C, 74.10; H, 8.38, H, 8.59.

Similarly, other 3-keto-11α-hydroxy-4,17(20)-pregnadiene-21-oic acid esters are prepared wherein the ester is methyl, propyl, butyl, amyl, hexyl, heptyl, octyl, or the like, by replacing the sodium methoxide in methanol used in the above-described reaction by the selected alkali-metal alkoxide in an alkanol.

*Example 5A.—3 - keto - 11β - hydroxy - 4,17(20) - pregnadiene-21-oic acid ethyl ester*

In the same manner as described in Example 4A, 3-keto-11β-hydroxy-4,17(20)-pregnadiene-21-oic acid ethyl ester is prepared by replacing the sodium methoxide in methanol used in the above described example by sodium ethoxide in ethanol and 11β-hydroxy-21,21-dibromo-21-ethoxyoxalylprogesterone or another 11β-hydroxy-21,21-dihalo - 21 - alkoxyoxalylprogesterone, or 11β - hydroxy - 21,21 - dibromo - 21 - formylprogesterone, or another 11β-hydroxy-21,21-dihalo - 21 - formylprogesterone for the 11α-hydroxy-21,21-dibromo-21-ethoxyoxalylprogesterone used therein.

*Example 6A.—3-keto-11α-hydroxy-4,17(20)-pregnadiene-21-oic acid*

In exactly the same manner as given in Example 4A, 3-keto-11α-hydroxy-4,17(20)-pregnadiene-21-oic acid is prepared from 11α-hydroxy-21,21-dibromo-21-ethoxyoxalylprogesterone by substituting 34 grams (0.6 mole) of potassium hydroxide for the sodium methoxide in the above-described reaction. 3-keto-11α-hydroxy-4,17(20)-pregnadiene-21-oic acid is isolated from the reaction mixture by adding water thereto, washing with methylene chloride, and then acidifying the washed reaction mixture. The precipitated 3-keto-11α-hydroxy-4,17(20)-pregnadiene-21-oic acid is purified by separating the precipitated product and crystallizing the dried product from a solvent such as, for example, acetone plus Skellysolve B hexane hydrocarbons.

*Example 7A.—3-keto-11α-hydroxy-4,17(20)-pregnadiene-21-oic acid*

In the same manner as described in Example 6A, 3-keto-11α-hydroxy-4,17(20)-pregnadiene-21-oic acid is prepared by reacting any of the dihalo compounds described in Examples 1A and 2A with a base, preferably an alkali-metal hydroxide or other alkali-metal base in the presence of water, and thereafter acidifying the reaction mixture, as with a mineral acid, e. g., hydrochloric, sulfuric acid, or the like, to produce the free acid.

*Example 8A.—3-keto-11α-hydroxy-4,17(20)-pregnadiene-21-oic acid methyl ester (without isolation of intermediate 21,21-dihalo compound)*

In essentially the same manner as described in Examples 4A and 5A, 3-keto-11α-hydroxy-4,17(20)-pregnadiene-21-oic acid methyl ester is prepared from the sodium enolate of 11α-hydroxy-21-ethoxyoxalylprogesterone by reaction of the latter compound with approximately two molar equivalents of bromine followed by the addition of sodium methoxide to the reaction without the isolation of the intermediately produced 3-keto-11α-hydroxy-21,21-dibromo-21-ethoxyoxalylprogesterone.

Similarly, 3-keto-11α-hydroxy-4,17(20)-pregnadiene-21-acid methyl ester and other alkyl esters are prepared from 11α-hydroxy-21-formylprogesterone or other 11α-hydroxy-21-alkoxyoxalylprogesterones described in Examples 1A and 2A without the isolation of the intermediately formed 21,21-dihalo compound by reaction of the selected 21-formyl or 21-alkoxyoxalyl compound with approximately two molar equivalents of the selected halogen in methanol or other alkanol followed by the addition thereto of sodium methoxide or other alkali-metal alkoxide and then acidifying the reaction mixture.

Similarly, 3-keto-11β-hydroxy-4,17(20)-pregnadiene-21-oic acid and alkyl esters thereof such as, for example, the methyl, ethyl, propyl, butyl, amyl, hexyl, heptyl, octyl ester, or the like, are prepared by reacting a 11β-hydroxy-21-alkoxyoxalyl-21,21-dihaloprogesterone or 11β-hydroxy-21-formyl-21,21-dihaloprogesterone with a base, e. g., sodium or potassium hydroxide, preferably in the presence of water, or a sodium or potassium alkoxide such as, for example, sodium methoxide, sodium ethoxide, potassium butoxide, or the like, according to the procedure described in Examples 4A through 8A.

*Example 9A.—3-ethylene glycol ketal of 3-keto-11α-hydroxy-4,17(20)-pregnadiene-21-oic acid methyl ester*

To a solution of 1.5 grams (0.0042 mole) of 3-keto-11α-hydroxy-4,17(20)-pregnadiene-21-oic acid methyl ester in 150 milliliters of benzene were added 7.5 milliliters of ethylene glycol and 0.150 gram of para-toluenesulfonic acid and the whole was then refluxed and stirred for 5.5 hours. The cooled solution was then washed with 100 milliliters of a one percent aqueous sodium bicarbonate solution whereafter the washed solution was poured over a column of 200 grams of Florisil magnesium silicate. The column was developed with 200-milliliter portions of solvents of the following composition and order: four of Skellysolve B hexane hydrocarbons plus four percent acetone, four of Skellysolve B plus six percent acetone, four of Skellysolve B plus ten percent acetone, four of Skellysolve B plus fifteen percent acetone, and finally, two portions of acetone. The last Skellysolve B plus ten percent acetone eluate and the first three Skellysolve B plus fifteen percent acetone eluate fractions were combined, the solvent removed therefrom, and the residual 3-ethylene glycol ketal of 3-keto-11αhydroxy-4,17(20)-pregnadiene-21-oic acid methyl ester was recrystallized from a mixture of ethyl acetate and Skellysolve B hexane hydrocarbons to give 1.46 grams of crystals melting at 181 to 185 degrees centigrade. Further recrystallization of these crystals gave 1.25 grams of the 3-ethylene glycol ketal of 3 - keto - 11α - hydroxy - 4,17(20) - pregnadiene - 21-oic acid methyl ester melting at 184 to 188 degrees centigrade.

*Analysis.*—Calculated for $C_{24}H_{34}O_5$: C, 71.65; H, 8.52. Found: C, 71.69, C, 71.86; H, 8.40, H, 8.40.

Similarly, the 3-ethylene glycol ketal of other esters of 3 - keto - 11α - hydroxy - 4,17(20) - pregnadiene - 21-oic acid such as, for example, the ethyl ester, the propyl, butyl, amyl, hexyl, heptyl, octyl, or like ester, is prepared by reacting the selected alkyl ester of 3-keto-11α-hydroxy-4,17(20)-pregnadiene-21-oic acid with ethylene glycol according to the method described in Example 9A in the presence of an acid catalyst such as, for example, hydrogen chloride, benzene sulfonic acid, para-toluenesulfonic acid, or the like.

*Example 10A.—3-trimethylene glycol ketal of 3-keto-11α-hydroxy-4,17(20)-pregnadiene-21-oic acid methyl ester*

In the same manner as described in Example 9A, reacting 3 - keto - 11α - hydroxy - 4,17(20) - pregnadiene-21-oic acid methyl ester with trimethylene glycol in the presence of para-toluenesulfonic acid is productive of the 3-trimethylene glycol ketal of 3,11-diketo-4,17(20)-pregnadiene-21-oic acid methyl ester.

Similarly, other 3-ketals of the ethyl and other esters of 3 - keto - 11α - hydroxy - 4,17(20) - pregnadiene - 21-oic acid and 3-keto-11β-hydroxy,4,17(20)-pregnadiene-21-oic acid are produced by reaction of a selected ester of one of the above-described steroid acids, especially the methyl, ethyl, propyl, butyl, amyl, hexyl, heptyl, or octyl ester, with a glycol such as, for example, ethylene glycol, propylene glycol, trimethylene glycol, an alkyl substituted ethylene glycol, propylene glycol, or trimethylene glycol, or the like, or with an alcohol such as, for example, methyl alcohol, ethyl, propyl, butyl, hexyl, heptyl, octyl, or like alcohol, in the presence of an acid catalyst such as, for example, para-toluenesulfonic acid, hydrogen chloride, sulfuric acid, or the like.

Following the procedure described in Example 9A, the 3-methyl enol ether of 3-keto-11α-hydroxy-4,17(20)-pregnadiene-21-oic acid methyl ester (3-methoxy-11α- hydroxy-3,5,17(20)-pregnatriene-21-oic acid methyl ester) is prepared by replacing the ethylene glycol in the above-described reaction with about a molar equivalent of methyl orthoformate.

Similarly, other 3-alkyl enol ethers of 3-keto-11α- or 11β-hydroxy-4,17(20)-pregnadiene-21-oic acid or alkyl esters thereof wherein the alkyl groups are methyl, ethyl, propyl, butyl, amyl, hexyl, heptyl, octyl, or the like, are prepared by reacting the selected alkyl orthoformate with 3-keto-11α-hydroxy- or 3-keto-11β-hydroxy-4,17(20)-pregdaniene-21-oic acid or an alkyl ester thereof in the presence of an acid catalyst.

*Example 11A.—3-ethylene glycol ketal of 11α,21-dihydroxy-4,17(20)-pregnadiene-3-one*

To a stirred solution of 0.25 gram of lithium aluminum hydride in fifty milliliters of absolute ether was added dropwise a solution of 0.4025 gram (0.001 mole) of the 3-ethylene glycol ketal of 3-keto-11α-hydroxy-4,17(20)-pregnadiene-21-oic acid methyl ester in 75 milliliters of absolute ether. The reaction mixture was refluxed for one-half hour after the addition was complete, whereafter the mixture was allowed to cool to room temperature. After maintaining the reaction mixture at room temperature for an additional hour, the excess lithium aluminum hydride and complexes thereof were decomposed by the dropwise addition of 100 milliliters of water to the reaction mixture. The ether layer was separated, dried with anhydrous sodium sulfate, and the solvent removed from the dried solution by distillation to yield as the residue essentially pure 3-ethylene glycol ketal of 11α,21-dihydroxy-4,17(20)-pregnadiene-3-one.

*Example 12A.—3-trimethylene glycol ketal of 11α,21-dihydroxy-4,17(20)-pregnadiene-3-one*

In the same manner as described in Example 11A, the 3-trimethylene glycol ketal of 11α,21-dihydroxy-4,17(20)-pregnadiene-3-one is prepared by reacting the 3-trimethylene glycol ketal of an alkyl ester of 3-keto-11α-hydroxy-4,17(20)-pregnadiene-21-oic acid, prepared as described in Examples 9A and 10A, with lithium aluminum hydride in ether.

Similarly, other 3-ketals of 11α,21- and 11β,21-dihydroxy-4,17(20)-pregnadiene-3-one are prepared by reacting a selected 3-keto-11β- or 11α-hydroxy-4,17(20)-pregnadiene-21-oic acid alkyl ester 3-ketal, such as those compounds described in Examples 9A and 10A, or the like, with lithium aluminum hydride in ether, dioxane, tetrahydrofurane, or other suitable solvent.

In the same manner as described in Example 11A, the 3-methyl enol ether or like alkyl enol ether of 11α,21-dihydroxy-4,17(20)-pregnadiene-3-one is prepared by substituting the 3-methyl enol ether or like alkyl enol ether of 3-keto-11α-hydroxy-4,17(20)-pregnadiene-21-oic acid or alkyl ester thereof, e. g., the methyl or ethyl ester, for the 3-ethylene glycol ketal of 3-keto-11α-hydroxy-4,17(20)-pregnadiene-21-oic acid methyl ester used in the above-described reaction.

*Example 13A.—11α,21-dihydroxy-4,17(20)-pregnadiene-3-one*

Repeating the reaction exactly as described in Example 11A, but substituting 100 milliliters of dilute hydrochloric acid for the water used therein to decompose the lithium aluminum hydride, 11α,21-dihydroxy-4,17(20)-pregnadiene-3-one is isolated from the reaction. Distillation of the dried ether layer in the same manner as described in Example 11A yields the theoretical 0.330 gram of 11α,21-dihydroxy-4,17(20)-pregnadiene-3-one.

In the same manner as described in Example 13A, 11α,21-dihydroxy-4,17(20)-pregnadiene-3-one is prepared by contacting other 3-ketals of 11α,21-dihydroxy-4,17(20)-pregnadiene-3-one, especially the 3-ketals described in Examples 11A and 12A, with a hydrolyzing agent such as, for example, dilute hydrochloric acid, sulfuric acid, or the like.

Similarly, 11β,21-dihydroxy-4,17(20)-pregnadiene-3-one is prepared by substituting a 3-ketal or 3-enol ether of 11β,21-dihydroxy-4,17(20)-pregnadiene-3-one for a 3-ketal or 3-enol ether of 11α,21-dihydroxy-4,17(20)-pregnadiene-3-one in the above-described reaction.

*Example 14A.—11α-hydroxy-21-acetoxy-4,17(20)-pregnadiene-3-one*

To a solution of 0.330 gram (0.001 mole) of 11α,21-dihydroxy-4,17(20)-pregnadiene-3-one dissolved in 25 milliliters of benzene was added 0.105 gram (0.001 mole) of acetic anhydride in 0.158 gram of dry pyridine. The reaction mixture was maintained at about 25 degrees centigrade for sixteen hours, whereafter the mixture was washed twice with water and the washed benzene solution then partially distilled on a steam bath to dry the solution. The dry solution was poured over a column of 100 grams of Florisil magnesium silicate and the column was then developed with 200-milliliter portions of solvents of the following composition and order: two of methylene chloride, four of methylene chloride plus four percent acetone, four of methylene chloride plus six percent acetone, four of methylene chloride plus eight percent acetone, four of methylene chloride plus ten percent acetone, four of methylene chloride plus fifteen percent acetone, and finally, two of acetone. The eluate fractions rich in 11α-hydroxy-21-acetoxy-4,17(20)-pregnadiene-3-one were combined, the solvent removed, and the residue recrystallized to yield essentially pure 11α-hydroxy-21-acetoxy-4,17(20)-pregnadiene-3-one.

Similarly, other 21-organic carboxylic acid esters of 11α,21- and 11β,21-dihydroxy-4,17(20)-pregnadiene-3-one are prepared wherein the 21-acyloxy group is formyloxy, propionyloxy, butyryloxy, valeryloxy, hexanoyloxy, heptanoyloxy, octanoyloxy, benzoyloxy, phenylacetoxy, or the like, by contacting 11α,21- or 11β,21-dihydroxy-4,17(20)-pregnadiene-3-one with an appropriate acylating agent, e. g., the anhydride or acid halide of the selected acid in a solvent such as, for example, benzene, toluene, acetic acid, or the like. A convenient method of preparing the 21-formyloxy ester consists in contacting 11α,21- or 11β,21-dihydroxy-4,17(20)-pregnadiene-3-one with formic acid in the presence of paratoluenesulfonic acid.

*Example 15A.—21-acetoxy-4,17(20)-pregnadiene-3,11-dione*

To a stirred solution of 0.150 gram (0.0004 mole) of 11α-hydroxy-21-acetoxy-4,17(20)-pregnadiene-3-one dissolved in 17.5 milliliters of glacial acetic acid and thereafter cooled to fourteen degrees centigrade was added dropwise, over a period of twenty minutes, a solution of 0.0825 gram of chromium trioxide dissolved in 1.65 milliliters of glacial acetic acid and 1.65 milliliters of water. The temperature of the stirred solution was thereafter allowed to rise to eighteen degrees centigrade over a period of one hour. The excess chromium trioxide was destroyed by the addition of an aqueous sodium sulfite solution, and the product then extracted from the reaction mixture with three fifteen-milliliter portions of ether which were thereafter combined, washed with water, and dried over anhydrous sodium sulfate. The ether was then removed by evaporation. The 0.168 gram of residue consisted essentially of 21-acetoxy-4,17(20)-pregnadiene-3,11-dione, which was thereafter purified by recrystallization from a mixture of ethyl acetate and Skellysolve B hexane hydrocarbons.

Similarly, other 21-organic carboxylic acid esters of 21-hydroxy-4,17(20)-pregnadiene-3,11-dione are prepared wherein the 21-acyloxy group is formyloxy, propionyloxy, butyryloxy, valeryloxy, hexanoyloxy, heptanoyloxy, octanoyloxy, benzyloxy, phenylacetoxy, or the like, by contacting the 11α- or 11β-hydroxy-21-acyloxy-4,17(20)-pregnadiene-3-one with an oxidizing agent such as, for example, chromic acid in acetic acid, or the like.

*Example 16A.—17α,21-dihydroxy-4-pregnene-3,11,20-trione (Kendall's Compound E)*

To a stirred solution of 0.123 gram (0.00033 mole) of 21-acetoxy-4,17(20)-pregnadiene-3,11-dione in two milliliters of tertiary butyl alcohol is added 0.26 milliliter of a 2.6 molar solution of hydrogen peroxide in tertiary butyl alcohol and 1.00 gram of osmium tetroxide in 100 milliliters of tertiary butyl alcohol. While maintaining the reaction mixture at room temperature for 24 hours, an additional 0.05 milliliter of osmium tetroxide is added, during which time the reaction mixture becomes homogeneous. After 72 hours of maintaining the reaction mixture at room temperature, water is added thereto and the whole then distilled at reduced pressure to free the mixture of organic solvent. The distillation residue is extracted with methylene chloride followed by distillation to remove the methylene chloride. The residue, after dissolving in a mixture of water and methanol, is mixed with 0.50 gram of sodium sulfite and thereafter heated on a steam bath for one-half hour. The 17α,21-dihydroxy-4-pregnene-3,11,20-trione is removed from the cooled solution by extraction with methylene chloride. Subsequent distillation of the methylene chloride is productive of a residue consisting essentially of 17α,21-dihydroxy-4-pregnene-3,11,20-trione (Kendall's Compound E). Fractional crystallization separates a small amount of 17α-hydroxy-21-acetoxy-4-pregnene-3,11,20-trione present therein.

In a like manner, 17α,21-dihydroxy-4-pregnene-3,11,20-trione is prepared by contacting other esters of 21-dihydroxy-4,17(20)-pregnadiene-3,11-dione, especially the esters described in Example 15A, with osmium tetroxide and hydrogen peroxide, perchloric acid, or other perhalo acid, or salt thereof, peracetic acid, perbenzoic acid, or the like, in tertiary butyl alcohol, ethyl ether, or other suitable solvent.

Similarly, the reaction of 11α,21-dihydroxy-4,17(20)-pregnadiene-3,20-dione with osmium tetroxide and hydrogen peroxide according to the method described above is productive of 11α,17α,21-trihydroxy-4-pregnene-3,20-dione.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A compound selected from the group consisting of (1) a compound represented by the formula:

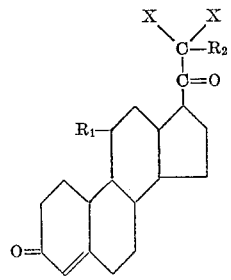

and (2) a compound represented by the formula:

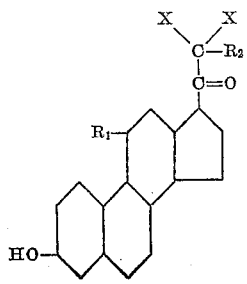

wherein $R_1$ is a member of the group consisting of hydrogen, α-hydroxy, β-hydroxy and keto, $R_2$ is a member of the group consisting of formyl and alkoxyoxalyl wherein the alkyl group contains from one to eight carbon atoms, inclusive, and X is a member of the group consisting of chlorine, bromine and iodine.

2. 11 - keto-21,21 - dihalo-21-alkoxyoxalylprogesterone represented by the following formula:

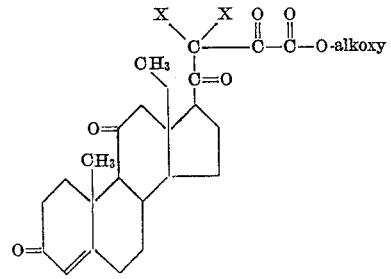

wherein X represents a halogen atom and wherein the halogen atoms at position 21 are the same and each has an atomic weight from 35 to 127 and wherein the alkoxy group contains from one to eight carbon atoms, inclusive.

3. 11 - hydroxy - 21,21 - dihalo - 21 - alkoxyoxalylprogesterone represented by the following formula:

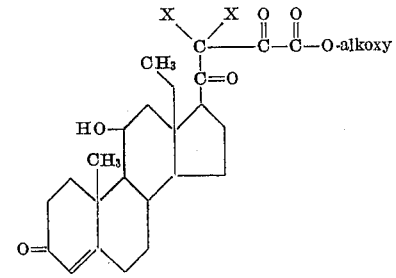

wherein X represents a halogen atom and wherein the halogen atoms at position 21 are the same and each has an atomic weight from 35 to 127 and wherein the alkoxy group contains from one to eight carbon atoms, inclusive.

4. 11 - keto - 21,21 - dihalo - 21 - formylprogesterone represented by the following formula:

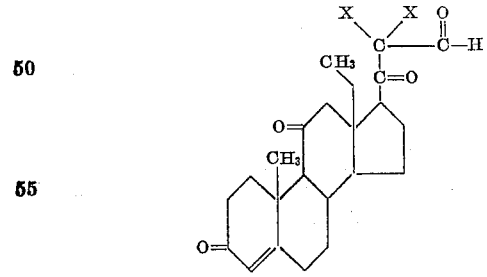

wherein X represents a halogen atom and wherein the halogen atoms at position 21 are the same and each has an atomic weight from 35 to 127.

5. 11-hydroxy-21,21-dihalo-21-formylprogesterone represented by the following formula:

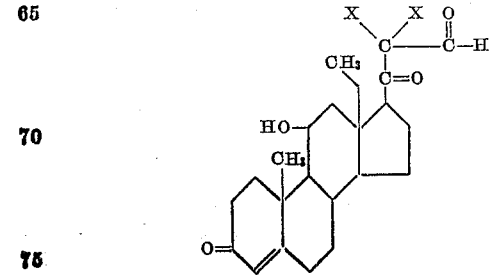

wherein X represents a halogen atom and wherein the halogen atoms at position 21 are the same and each has an atomic weight from 35 to 127.

6. 11-keto-21,21-dibromo-21-ethoxyoxalylprogesterone.

7. 11α-hydroxy - 21,21-dibromo-21-methoxyoxalylprogesterone.

8. 11α - hydroxy - 21,21 - dibromo - 21 - ethoxyoxalylprogesterone.

9. 11-keto-21,21-dibromo-21-formylprogesterone.

10. 11α - hydroxy - 21,21 - dibromo-21-formylprogesterone.

11. A process for the production of a 20-keto-21,21-dihalo-21-acylsteroid which comprises: contacting a compound selected from pregnane, pregnene, and pregnadiene compounds having in the 17-position a side chain represented in its enolic form by the following

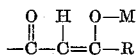

wherein M is selected from the group consisting of hydrogen and an alkali metal, wherein R is selected from the group consisting of hydrogen and a radical having the formula

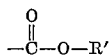

R′ being a hydrocarbon radical with about two molar equivalents of a halogen having an atomic weight from 35 to 127, in an organic solvent for the reaction, to produce a 20-keto-21,21-dihalo-21-acylsteroid.

12. A process for the production of a 20-keto-21,21-dihalo-21-acylsteroid which comprises: contacting a compound selected from pregnane, pregnene, and pregnadiene compounds having in the 17-position a side chain represented in its enolic form by the following

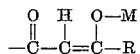

wherein M is selected from the group consisting of hydrogen and an alkali metal, wherein R is selected from the group consisting of hydrogen and a radical having the formula

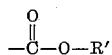

R′ being a hydrocarbon radical with about two molar equivalents of bromine, in an organic solvent for the reaction, to produce a 20-keto-21,21-di-halo-21-acylsteroid.

13. A process for the production of a 20-keto-21,21-dihalo-21-acylsteroid which comprises: contacting a compound selected from pregnane, pregnene, and pregnadiene compounds having in the 17-position a side chain represented in its enolic form by the following

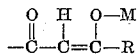

wherein M is selected from the group consisting of hydrogen and an alkali metal, wherein R is selected from the group consisting of hydrogen and a radical having the formula

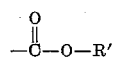

R′ being a hydrocarbon radical with about two molar equivalents of bromine in an alkanol and in the presence of a base, at a temperature between about zero degrees centigrade and about sixty degrees centigrade, to produce a 20-keto-21,21-dihalo-21-acylsteroid.

14. A process for the production of 11-keto-21,21-dihalo-21-alkoxyoxalylprogesterone which comprises: contacting 11-keto-21-alkoxyoxalylprogesterone alkali-metal enolate with about two molar equivalents of a halogen having an atomic weight from 35 to 127, in the presence of a solvent, to produce an 11-keto-21,21-dihalo-21-alkoxyoxalylprogesterone.

15. The process of claim 14 wherein the halogenating agent is bromine.

16. A process for the production of 11α-hydroxy-21,21-dihalo-21-alkoxyoxalylprogesterone which comprises: contacting 11α - hydroxy - 21 - alkoxyoxalylprogesterone alkali-metal enolate with about two molar equivalents of a halogen having an atomic weight from 35 to 127, in the presence of a solvent, to produce an 11α-hydroxy-21,21-dihalo-21-alkoxyoxalylprogesterone.

17. The process of claim 16 wherein the halogenating agent is bromine.

18. A process for the production of 11-keto-21,21-dihalo-21-formylprogesterone which comprises: contacting 11-keto-21-formylprogesterone alkali-metal enolate with about two molar equivalents of a halogen having an atomic weight from 35 to 127, in the presence of a solvent, to produce an 11-keto-21,21-dihalo-21-formylprogesterone.

19. The process of claim 18 wherein the halogenating agent is bromine.

20. A process for the production of 11α-hydroxy-21,21-dihalo-21-formylprogesterone which comprises: contacting 11α - hydroxy - 21 - formylprogesterone alkali-metal enolate with about two molar equivalents of a halogen having an atomic weight from 35 to 127, in the presence of a solvent, to produce an 11α-hydroxy-21,21-dihalo-21-formylprogesterone.

21. The process of claim 20 wherein the halogenating agent is bromine.

22. A process for the production of 11-keto-21,21-dibromo-21-ethoxyoxalylprogesterone which comprises: contacting the sodium enolate of 11-keto-21-ethoxyoxalylprogesterone with about two molar equivalents of bromine, in an alkanol and in the presence of an alkali-metal salt of a lower-aliphatic acid, at a temperature between about zero degrees centigrade and about sixty degrees centigrade, to produce 11-keto-21,21-dibromo-21-ethoxyoxalylprogesterone.

23. A process for the production of 11α-hydroxy-21,21-dibromo-21-methoxyoxalylprogesterone which comprises: contacting the sodium enolate of 11α-hydroxy-21-methoxyoxalylprogesterone with about two molar equivalents of bromine, in an alkanol and in the presence of an alkali-metal salt of a lower-aliphatic acid, at a temperature between about zero degrees centigrade and about sixty degrees centigrade, to produce 11α-hydroxy-21,21-dibromo-21-methoxyoxalylprogesterone.

24. A process for the production of 11α-hydroxy-21,21-dibromo-21-ethoxyoxalylprogesterone which comprises: contacting the sodium enolate of 11α-hydroxy-21-ethoxyoxalylprogesterone with about two molar equivalents of bromine, in an alkanol and in the presence of an alkali-metal salt of a lower-aliphatic acid, at a temperature between about zero degrees centigrade and about sixty degrees centigrade, to produce 11α-hydroxy-21,21-dibromo-21-ethoxyoxalylprogesterone.

25. A process for the production of 11-keto-21,21-dibromo-21-formylprogesterone which comprises: contacting the sodium enolate of 11-keto-21-formylprogesterone with about two molar equivalents of bromine, in an alkanol and in the presence of an alkali-metal salt of a lower-aliphatic acid, at a temperature between about zero degrees centigrade and about sixty degrees centigrade, to produce 11-keto-21,21-dibromo-21-formylprogesterone.

26. A process for the production of 11α-hydroxy-21,21-dibromo-21-formylprogesterone which comprises: contacting the sodium enolate of 11α-hydroxy-21-formylprogesterone with about two molar equivalents of bromine, in an alkanol and in the presence of an alkali-metal salt of a lower-aliphatic acid, at a temperature between about zero degrees centigrade and about sixty degrees centigrade, to produce 11α-hydroxy-21,21-dibromo-21-formylprogesterone.

27. A process for the production of a 20-keto-21,21- dihalo-21-alkoxyoxalylsteroid which includes the steps of mixing a 20-keto-steroid selected from pregnane, pregnene, and pregnadiene compounds with an alkyl ester of oxalic acid in the presence of an alkali-metal base, to produce a steroid compound having in the 17-position a side chain represented in its enolic form by the following:

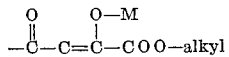

wherein M is an alkali metal, and reacting the thus-produced compound with about two molar equivalents of a halogen having an atomic weight from 35 to 127 to produce a 20-keto-21,21-dihalo-21-alkoxyoxalylsteroid.

28. A process for the production of a 20-keto-21,21-dihalo-21-formylsteroid which includes the steps of mixing a 20-ketosteroid selected from pregnane, pregnene, and pregnadiene compounds, with an alkyl ester of formic acid in the presence of an alkali-metal base, to produce a steroid compound having in the 17-position a side chain represented in its enolic form by the following

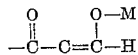

wherein M is an alkali metal, and reacting the thus-produced compound with about two molar equivalents of a halogen having an atomic weight from 35 to 137 to produce a 20-keto-21,21-dihalo-21-formylsteroid.

29. A process for the production of a 20-keto-21,21-dihalo-21-alkoxyoxalylsteroid which includes the steps of mixing a 20-ketosteroid selected from pregnane, pregnene, and pregnadiene compounds with an alkyl ester of oxalic acid in the presence of an alkali-metal base to produce an alkali-metal enolate of a 20-keto-21-alkoxyoxalyl-steriod, reacting the thus-produced alkali-metal enolate of a 20-keto-21-alkoxyoxalyl steroid with acid to produce a steroid compound having in the 17-position a side chain represented in its enolic form by the following

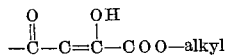

and reacting the thus-produced compound with about two molar equivalents of a halogen having an atomic weight from 35 to 127 to produce a 20-keto-21,21-dihalo-21-alkoxyoxalylsteroid.

30. A process for the production of a 20-keto-21,21-dihalo-21-formylsteroid which includes the steps of mixing a 20-ketosteroid selected from pregnane, pregnene, and pregnadiene compounds with an alkyl ester of formic acid in the presence of an alkali-metal base to produce an alkali-metal enolate of a 20-keto-21-formylsteroid, reacting the thus-produced alkali-metal enolate of a 20-keto-21-formylsteroid with acid to produce a steroid compound having in the 17-position a side chain represented in its enolic form by the following steroid:

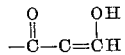

and reacting the thus-produced compound with about two molar equivalents of a halogen having an atomic weight from 35 to 127 to produce a 20-keto-21,21-dihalo-21-formylsteroid.

31. A process for the production of 11-keto-21,21-dibromo-21-alkoxyoxalylprogesterone which includes the steps of mixing 11-ketoprogesterone with an alkyl ester of oxalic acid, in the presence of an alkali-metal base, to produce an alkali-metal enolate of 11-keto-21-alkoxyoxalylprogesterone, and reacting the thus-produced alkali-metal enolate of 11-keto-21-alkoxyoxalylprogesterone with about two molar equivalents of bromine to produce an 11-keto-21,21-dibromo-21-alkoxyoxalylprogesterone.

32. A process for the production of 11α-hydroxy-21,21-dibromo-21-alkoxyoxalylprogsterone which includes the steps of mixing 11α-hydroxyprogesterone with an alkyl ester of oxalic acid, in the presence of an alkali-metal base, to produce an alkali-metal enolate of 11α-hydroxy-21-alkoxyoxalylprogesterone, and then reacting the thus-produced alkali-metal enolate of 11α-hydroxy-progesterone with about two molar equivalents of bromine to produce an 11α-hydroxy-21,21-dibromo-21-alkoxyoxalylprogesterone.

33. A process for the production of 11-keto-21,21-dibromo-21-formylprogesterone which includes the steps of mixing 11-ketoprogesterone with an alkyl ester of formic acid, in the presence of an alkali-metal base, to produce an alkali-metal enolate of 11-keto-21-formylprogesterone, and then reacting the thus-produced alkali-metal enolate of 11-keto-21-formylprogesterone with about two molar equivalents of bromine to produce 11-keto-21,21-dibromo-21-formylprogesterone.

34. A process for the production of 11α-hydroxy-21,21-dibromo-21-formylprogesterone which includes the steps of mixing 11α-hydroxy-progesterone with an alkyl ester of formic acid, in the presence of an alkali-metal base, to produce an alkali-metal enolate of 11α-hydroxy-21-formylprogesterone, and then reacting the thus-produced alkali-metal enolate of 11α-hydroxy-21-formylprogesterone with about two molar equivalents of bromine to produce 11α-hydroxy-21,21-dibromo-21-formylprogesterone.

35. 3,11,20-triketo-21,21-dihalo-21-alkoxyoxalyl-delta-4,5-17α-hydrogen-pregnene, wherein the halogen atoms at position 21 are the same and each has an atomic weight from 35 to 127, inclusive, and wherein the alkoxy group contains from one to eight carbon atoms, inclusive.

36. A process for the production of 21,21-dihalo-21-alkoxyoxalyl-pregnene which comprises: contacting 3,11,20-triketo-21-alkoxyoxalyl-delta-4,5 - 17α - hydrogen-pregnene with about two molar equivalents of a halogen having an atomic weight from 35 to 127, inclusive, in the presence of a solvent to produce the 21,21-dihalo-21-alkoxyoxalyl-pregnene.

37. A process for the production of 21,21-dihalo-21-alkoxyoxalyl-pregnene which comprises the steps of mixing 3,11,20-triketo-delta-4,5-17α-hydrogen-pregnene with an alkyl ester of oxalic acid, in the presence of an alkali-metal base, to produce an alkali-metal enolate of a 21-alkoxyoxalylpregnene steroid; contacting the alkali-metal enolate with acid to produce the free enol steroid; and contacting the thus-produced free enol steroid with about two molar equivalents of a halogen having an atomic weight from 35 to 127, inclusive, to produce the 21,21-dihalo-21-alkoxyoxalylpregnene.

References Cited in the file of this patent

UNITED STATES PATENTS

| 2,554,472 | Ruschig | May 22, 1951 |
| 2,554,473 | Ruschig | May 22, 1951 |
| 2,609,379 | Ruschig | Sept. 2, 1952 |

FOREIGN PATENTS

| 891,441 | France | 1944 |

OTHER REFERENCES

Fieser et al.: Natural Products Related to Phenanthrene, 3rd ed., pp. 407, 424–26 (1949).